(12) United States Patent
Parker et al.

(10) Patent No.: US 11,598,064 B2
(45) Date of Patent: Mar. 7, 2023

(54) LAKE RESTORATION SYSTEMS AND PROCESSES

(71) Applicant: LAKE RESTORATION SOLUTIONS, INC., Bountiful, UT (US)

(72) Inventors: Benjamin Parker, Saratoga Springs, UT (US); Todd Parker, Bountiful, UT (US); Ryan Benson, Bountiful, UT (US)

(73) Assignee: Lake Restoration Solutions, Inc., Bountiful, UT (US)

( * ) Notice: Subject to any disclaimer, the term of this patent is extended or adjusted under 35 U.S.C. 154(b) by 49 days.

(21) Appl. No.: 17/157,792

(22) Filed: Jan. 25, 2021

(65) Prior Publication Data

US 2021/0148076 A1 May 20, 2021

Related U.S. Application Data

(63) Continuation of application No. 16/560,169, filed on Sep. 4, 2019, now Pat. No. 10,934,676.
(Continued)

(51) Int. Cl.
*E02B 17/00* (2006.01)
*E02D 5/00* (2006.01)
(Continued)

(52) U.S. Cl.
CPC .............. *E02B 17/00* (2013.01); *A01C 1/044* (2013.01); *A01G 7/00* (2013.01); *A01M 19/00* (2013.01);
(Continued)

(58) Field of Classification Search
CPC ............ E02B 17/00; E02B 1/003; E02B 3/18; A01C 1/044; A01G 7/00; A01M 19/00; A01M 21/00; C02F 3/046; C02F 2103/007; C02F 2209/00; C02F 9/00; C02F 1/56; C02F 3/04; C02F 3/20; C02F 3/308;
(Continued)

(56) References Cited

U.S. PATENT DOCUMENTS 4,134,831 A   1/1979  Dawson et al.
6,623,214 B1  9/2003  Hauske
(Continued)

FOREIGN PATENT DOCUMENTS

CN   102493397 A    6/2012
CN   102733349      10/2012
(Continued)

OTHER PUBLICATIONS

Parker , et al., International Search Report and Written Opinion dated Jan. 14, 2020 for international application PCT/US2019/049479.
(Continued)

*Primary Examiner* — Fred Prince
(74) *Attorney, Agent, or Firm* — Foley & Lardner LLP

(57) ABSTRACT

Systems and methods of restoring a lake including dredging, island creation, water treatment, real estate development, computer modeling of environmental conditions, wave height reduction, sediment removal and encapsulation, bathymetry contouring, littoral zone restoration, plant restoration, and/or fish restoration.

20 Claims, 10 Drawing Sheets

Related U.S. Application Data

(60) Provisional application No. 62/726,748, filed on Sep. 4, 2018.

(51) Int. Cl.
| | | |
|---|---|---|
| *E02D 7/00* | (2006.01) | |
| *E02D 27/52* | (2006.01) | |
| *E02D 3/10* | (2006.01) | |
| *E02D 3/02* | (2006.01) | |
| *A01M 21/00* | (2006.01) | |
| *A01M 19/00* | (2006.01) | |
| *A01G 7/00* | (2006.01) | |
| *A01C 1/04* | (2006.01) | |
| *C02F 3/04* | (2006.01) | |
| *E02F 5/28* | (2006.01) | |
| *G06F 30/20* | (2020.01) | |
| *C02F 103/00* | (2006.01) | |
| *G06F 111/10* | (2020.01) | |

(52) U.S. Cl.
CPC .............. *A01M 21/00* (2013.01); *C02F 3/046* (2013.01); *E02D 3/02* (2013.01); *E02D 3/10* (2013.01); *E02D 5/00* (2013.01); *E02D 7/00* (2013.01); *E02D 27/52* (2013.01); *E02F 5/28* (2013.01); *G06F 30/20* (2020.01); *C02F 2103/007* (2013.01); *E02D 2250/0023* (2013.01); *E02D 2300/0085* (2013.01); *G06F 2111/10* (2020.01)

(58) Field of Classification Search
CPC ................ C02F 3/327; C02F 2101/105; C02F 2101/16; C02F 2103/001; C02F 1/001; E02D 3/02; E02D 3/10; E02D 5/00; E02D 7/00; E02D 27/52; E02D 2250/0023; E02D 2300/0085; E02F 5/28; E02F 3/907; E02F 9/2054; G06F 30/20; G06F 2111/10; Y02A 90/40; Y02W 10/10; Y02W 10/37
USPC ................... 210/170.4, 170.09, 747.4, 747.5
See application file for complete search history.

(56) References Cited

U.S. PATENT DOCUMENTS

| | | |
|---|---|---|
| 7,832,959 B1 | 11/2010 | Groen et al. |
| 8,585,318 B1 | 11/2013 | Walker |
| 2002/0139747 A1 | 10/2002 | Gantzer |
| 2003/0062319 A1 | 4/2003 | Keller et al. |
| 2005/0222862 A1 | 10/2005 | Lachman |
| 2006/0104721 A1 | 5/2006 | Choi |
| 2011/0108472 A1 | 5/2011 | Kania et al. |
| 2012/0024794 A1 | 2/2012 | Fischmann |
| 2015/0023734 A1 | 1/2015 | Higgins |
| 2015/0125212 A1 | 5/2015 | Fischmann |
| 2015/0166361 A1 | 6/2015 | Fischmann |
| 2019/0194044 A1 | 6/2019 | Gu et al. |
| 2020/0063388 A1 | 2/2020 | Rodriguez Larreta et al. |
| 2020/0071897 A1 | 3/2020 | Parker et al. |

FOREIGN PATENT DOCUMENTS

| | | | |
|---|---|---|---|
| CN | 102926351 | | 2/2013 |
| CN | 113402033 A | * | 9/2021 |
| WO | 2020051198 | | 3/2020 |

OTHER PUBLICATIONS

Parker, et al., Notice of Allowance dated Nov. 27, 2020 for U.S. Appl. No. 16/560,169.

Parker, et al., Office Action dated Jun. 16, 2020 for U.S. Appl. No. 16/560,169.

* cited by examiner

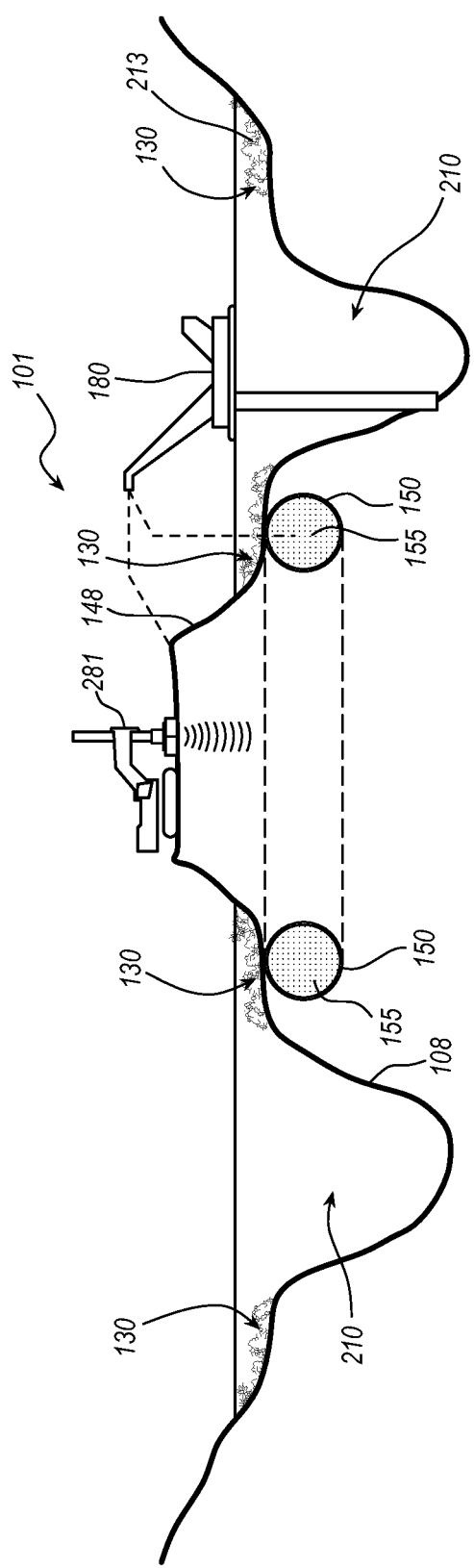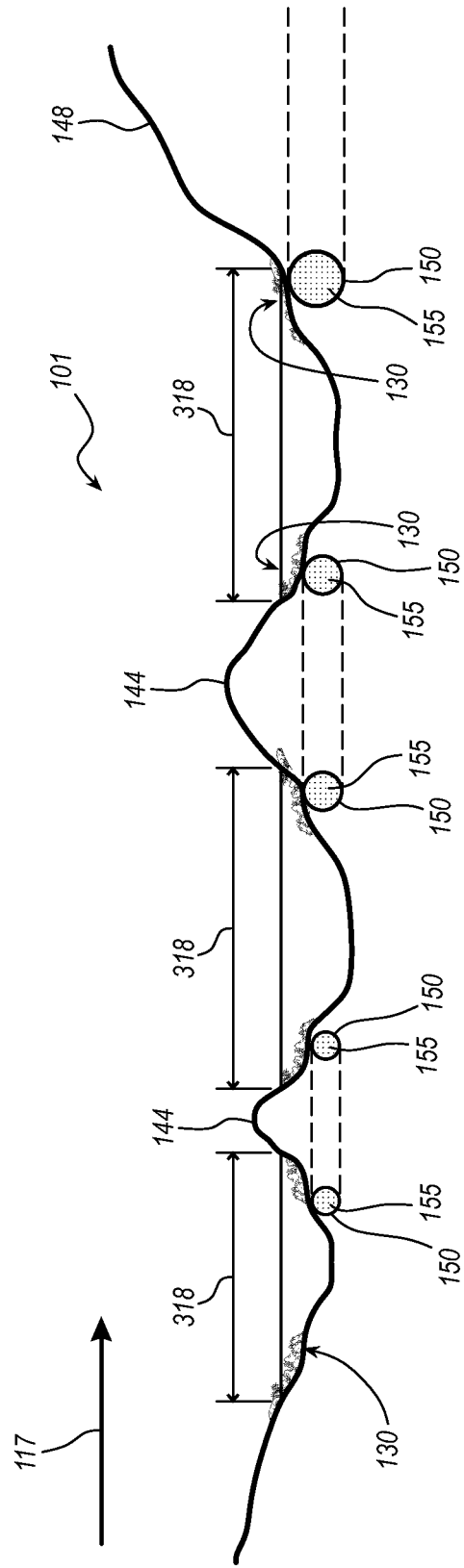

ns and Processes" and claims priority to U.S. Provisional Application No. 62/726,748 filed on Sep. 4, 2018 and titled "Lake Restoration," both of which are hereby incorporated by reference in their entirety.

TECHNICAL FIELD

The present disclosure relates generally to the field of restoring or improving the environmental conditions of a body of water and surrounding areas. More specifically, present disclosure relates to restoring a lake.

BACKGROUND

A lake may hold valuable potential as a resource for the environment and its residents. A lake's importance, both ecologically and as a freshwater resource, may often be a focal point of natural resource systems that contribute to the environmental health, economic prosperity, and quality of life of area residents and visitors.

In recent years, significant concern has arisen about nutrient loading and eutrophic and hyper-eutrophic lake systems. Not only does nutrient loading impact water quality, but can have negative impact on the flora and fauna in and around the lake system. It has been reported that there are thousands of eutrophic lakes in the United States alone.

These problems can be further exacerbated in shallow lakes. Nutrient loading, invasive species, and other challenges can result in the loss of littoral zone plants. These plants help anchor the lakebed and process nutrients that are introduced into the lake. Invasive fish species such as carp, predatory fish can further impact littoral zone plant loss and result in loss of native minnow and larger fish species. Invasive plants such as *Phragmites* can begin to replace and eventually dominate native emergent plant species.

In some instances these lakes may historically have been a clear-water lake with a vibrant ecosystem of freshwater vegetation, aquatic and terrestrial species, shorebirds, waterfowl, etc. Over time, however, ecological impairment of a lake may become a significant concern. Over time, a lake may become significantly underutilized as a recreational destination, despite easy accessibility by large numbers of residents. During the summer months, water quality degradation, including significant algal blooms and *e-coli* outbreaks, may lead to suspension of many recreational activities for weeks at a time.

Factors that may negatively impact a lake may include:
1. Fluctuating lake levels
2. Loss of aquatic plant species from invasive fish
3. Heavy phosphorus and nitrogen loading
4. Increased wind and wave action
5. Uncontrolled algal blooms
6. Loss of habitat to invasive plant species.

Instead of a clean, clear-water lake, a lake may become a turbid, hypereutrophic lake with significantly degraded water quality. This may not only present significant challenges from a water supply standpoint, but also may heavily impact the native terrestrial and aquatic species that utilize the lake.

Native fish may be over harvested, severely depleting native fish populations. Introduction of non-native species, such as carp, may further deplete native fish populations. As the surrounding human population grows and agricultural use of the land increases, run-off and seepage of agricultural waste, including fertilizers and stockyard waste, etc., may significantly affect the chemistry of the lake. These factors may contribute to adverse effects on water quality, aquatic ecology, and shoreline vegetation.

These problems can be further exacerbated in shallow lakes. Nutrient loading, invasive species, and other challenges can result in the loss of littoral zone plants. Invasive fish species such as carp, can further impact littoral zone plant vegetation. Loss of native vegetation may also result in the loss of habitat and cover for zooplankton, native fish, such as minnow species, and young of larger fish species, allowing them to become easy prey for a predator fish.

In some instances the lake or body of water may become eutrophic. A eutrophic condition is where the body of water has lost so much of its dissolved oxygen that normal aquatic life begins to die off. Eutrophic conditions may form when water entering the body of body contains too many nutrients, especially phosphorus and nitrogen. The excess nutrients and/or other microorganisms may cause algae to grow out of control especially during time periods of warmer water, and when the algae die off, the bacteria present may use up a lot of the dissolved oxygen in the water body. Lack of oxygen can harm the lake's ecosystem. High levels of phosphorus can result in high levels of nuisance algae growth, low dissolved oxygen, and elevated pH levels.

A number of significant issues may combine to cause severe degradation of the lake and create a highly impaired ecosystem. In many cases, addressing only some of these challenges may not be sufficient to restore a lake to its historical state of quality. In fact, the multi-factored causes of eutrophic and hyper-eutrophic lakes can make them very difficult and expensive to restore to the natural state of a clear water lake. Hence, in some cases, a comprehensive restoration will require that all or practically all factors degrading the lake be addressed. A short overview of some common issues is provided below.

Evaporation may be a significant challenge on the lake. The lake may have a large surface area, combined with the shallow depth, resulting in a high percentage of lake water lost to evaporation. For example, a lake may lose as much or more than 50% of its volume due to evaporation annually. Water utilization practices and changes to lake inflows may also result in significant lake level fluctuations throughout a year. This may be particularly important if population growth projections and future water consumption needs indicate significant increase in coming years. Reducing evaporation may result in more water for local residents and for conservation needs.

In some cases, a littoral zone, emergent, and shoreline plant species in and around the lake may have historically processed phosphorus and other nutrients, and provided food and habitat for fish, birds, and terrestrial species. Healthy aquatic plant communities may have historically helped anchor the lake bottom during wind/wave events, regulate nutrient levels, and control phytoplankton numbers. As such, loss of the aquatic plants may contribute to the loss of many natural mechanisms for protecting lake water clarity and quality.

Littoral zones and emergent plants generally provide habitat for zooplankton and native minnow species that feed on phytoplanktons. Zooplankton breed, seek protection, and thrive in the cover of submerged plants in a lake's littoral zones. Tiny minnows, such as the least chub, generally consume large quantities of phytoplankton. In turn, larger fish, rely on these smaller species. Some species of fish may feed almost entirely on zooplankton. Other species of fish, such as trout, may feed on minnow species and other endemic fish. In this way, zooplankton, minnows, and other fish benefit from a healthy food column and lake ecosystem. Birds and terrestrial species may heavily rely on fish and other aquatic species for food. Invertebrates, such as mollusks, may also play a role in water quality by filtering lake water. In some cases, the restoration of native fish and aquatic species may be a major focus of a lake restoration project.

Certain fish species that may be non-native to the lake may significantly affect the lakes ecosystem. For example, common carp are voracious and consume large quantities of submerged vegetation and/or uproot/destroy submerged vegetation while feeding on invertebrates in the lakebed sediments. This submerged vegetation within littoral zones may hold lake sediments in place and provide shelter for populations of other fish species. Eventually, a carp population may consume so much submerged vegetation that littoral zones begin to shrink or disappear entirely. As the plants disappear, the anchoring of the lake bottom is lost, wind and wave action stir up sediments, and phosphorus and nitrogen levels increase.

Suspension and resuspension of the lake bottom may cause the lake to become increasingly unsuitable for plant life. Loss of littoral zone plants which secure the lake bed may allow forces during wind/wave events to cause re-suspension of sediments on the lake bottom. This significantly increases mud and sediments in the water column. This can prevent or inhibit light penetration to the lake bottom meaning loss of light needed for healthy littoral zones, death of existing littoral zone plants, and the failure to re-establish littoral zone plants.

Any restoration of plants that historically and successfully rooted in the lake bottom becomes difficult. Fragile littoral zone re-plantings may quickly be destroyed by high carp populations resulting in littoral zone plants that are virtually nonexistent in the lake and the vast majority of the lake bottom being a moonscape devoid of plant life. This not only leads to the loss of native plants, but also of zooplankton, minnow, and other fish that depend on zooplankton as a food source.

In some cases, nitrogen, phosphorus, and other waste solids may have been released into a lake for many years. The sources of these nutrients may have been both untreated and treated waste water, other waste solids, fertilizer, agricultural biomass, and other natural and manmade sources, which are high in nitrogen and phosphorus. As such, large volumes of sediment may cover the lake bottom. The sediments on the bottom of a lake generally act as a "sink" absorbing these nutrients in high quantities. As a result, and without the natural removal of nutrients by littoral zone plants, these sediments may become a persistent source of high nutrient pollution levels within the water column. The water column comprises the water extending from the surface to the bottom of a body of water. As such, the lake may assume a condition where it can no longer sufficiently recover and restore itself naturally.

In some instances, treated water from waste treatment facilities may be a source of nitrogen and phosphorus being loaded into a lake. The accumulation of phosphorus, nitrogen, and total dissolved solids may contribute to elevated, unsustainable, and unhealthy nutrient loading within the lake sediments. The elevated nutrient levels within the sediments may also leach into upper levels of the lake bed. Agricultural and storm water run-off, residential fertilizers, and even ambient dust may all contribute to the addition of nutrients in the lake.

Wind events may be a regular occurrence on a lake. It may not be unusual to have regular wind events in the 11 to 26-mile-per-hour range, with even stronger winds exceeding 50 miles per hour occurring perhaps less regularly. When a wind event occurs, large waves move across a shallow lake, leading to disruption and near constant resuspension of the sediment disposed on the lake bottom. This resuspension may be sufficient to cause significant turbidity of the water. Turbidity of the lake water and resuspension of the lake bottom results in suspended solids and nutrients in the sediments being more able to leach into the water column. During these wind/wave events nutrient levels increase. Turbidity of the lake water may also be caused by anthropogenic factors such as boat prop-wash by boaters recreating on the lake.

During wind/wave events, re-suspension of these sediments significantly increases nutrient levels in the water column. During the warm summer months, excessive nutrients may contribute to explosive growth of phytoplanktons and cyanobacterium, typically referred to as an "algal bloom." In some cases, algal blooms on a lake may grow out of control and produce toxic or harmful effects on people, fish, birds, and other aquatic and terrestrial species. This can kill flora and fauna in the lake, and even become dangerous for humans to utilize the lake for water, fishing, or recreation.

Invasive plants may also be problematic around a lake, including *Phragmites* (*Phragmites australis*), Russian olive, and Salt cedar or Tamarisk. *Phragmites* is a perennial, aggressive wetland grass that outcompetes native plants and displaces native animals. *Phragmites* can grow to over 15 feet tall and create dense monotypic stands with as many as 20 plants per square foot. These stands of *Phragmites* may replace high-quality, complex communities of native plants in many areas around a lake. Unlike native plant species, *Phragmites* provide little or no food and shelter for a lake's endemic wildlife. *Phragmites* may also eliminate the natural channels and intermittent pool habitat that are needed to support natural refuges, nesting areas, and feeding grounds for invertebrates, fish, avian, and terrestrial species along a lake. *Phragmites* also consume large quantities of water, further causing water level fluctuation.

Salt cedar, or Tamarisk, is a deciduous shrub or small tree, which can grow as high as 25 feet. Tamarisk can grow in dense thickets and favor alkaline soils surrounding a lake. Tamarisk create saltier soils, increase water alkalinity, and, like *Phragmites*, consume huge quantities of water.

BRIEF DESCRIPTION OF THE DRAWINGS

The written disclosure herein describes illustrative embodiments that are non-limiting and non-exhaustive. Reference is made to certain such illustrative embodiments that are depicted in the figures, in which:

FIG. 2 is a cross-sectional view of the lake shown in FIG. 1 cut along sectioning lines 2-2.

FIG. 3 is another cross-sectional view of the lake of FIG. 1 cut along sectioning lines 3-3.

DETAILED DESCRIPTION

The present disclosure is directed to systems and processes for restoring a lake. The embodiments of the disclosure will be best understood by reference to the drawings, wherein like parts are designated by like numerals throughout. The following detailed description of the embodiments of the systems and methods of the disclosure is not intended to limit the scope of the invention, as claimed, but is merely representative of possible embodiments of the disclosure. In addition, the steps of any method embodiments described herein do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that components of the embodiments as generally described and illustrated in the figures herein could be arranged and designed in a wide variety of different configurations.

Although the following description describes embodiments according to restoration of a lake, the term lake is merely an example of a body of water. The disclosed embodiments may be implemented to restore and or develop any body of water, including, but not limited to, a reservoir, a pond, a river, or any portion thereof.

Figure 1:
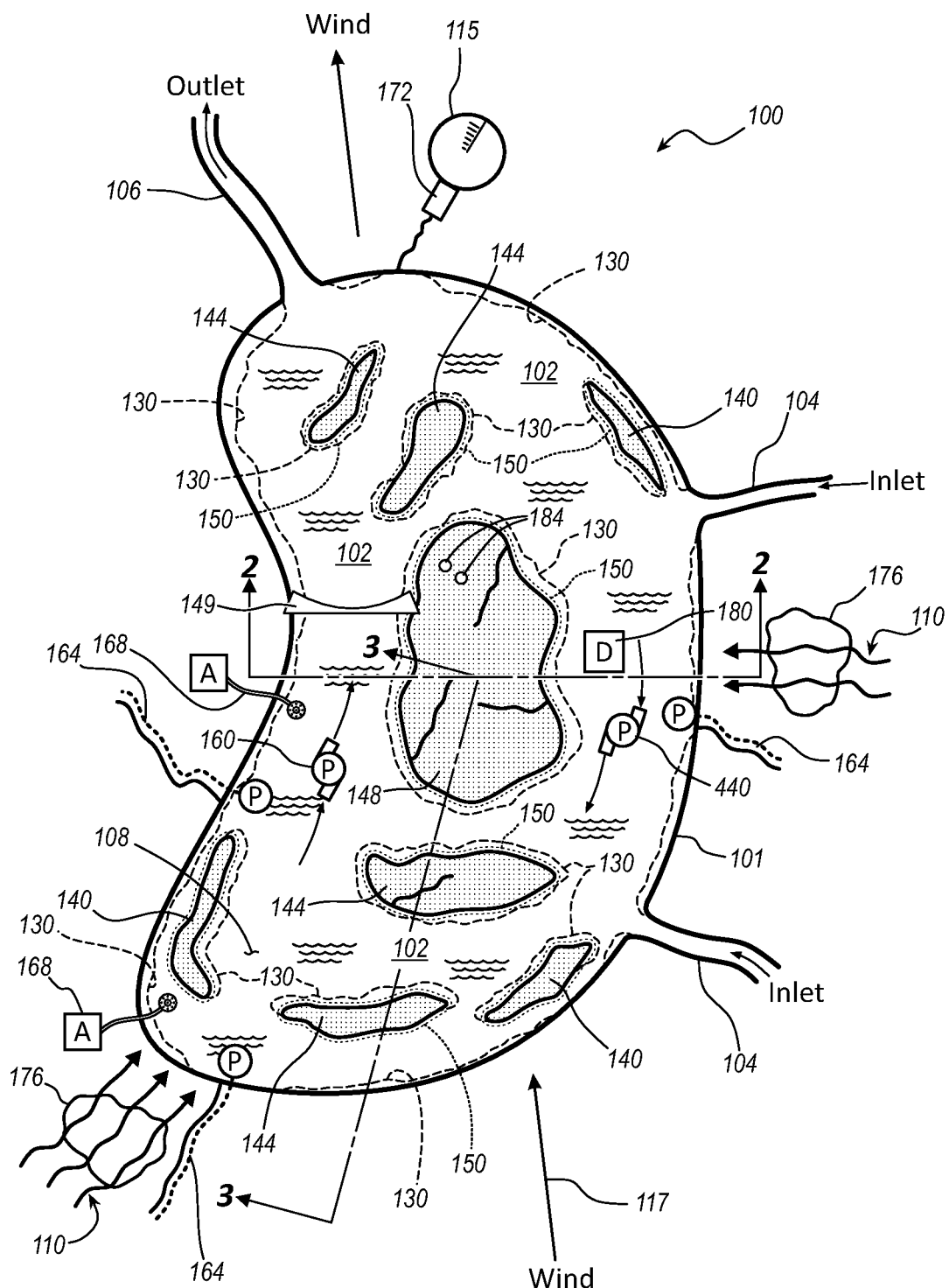
FIG. 1 is a top view illustration of a lake restoration system according to one embodiment of the present disclosure.
Figure 4:
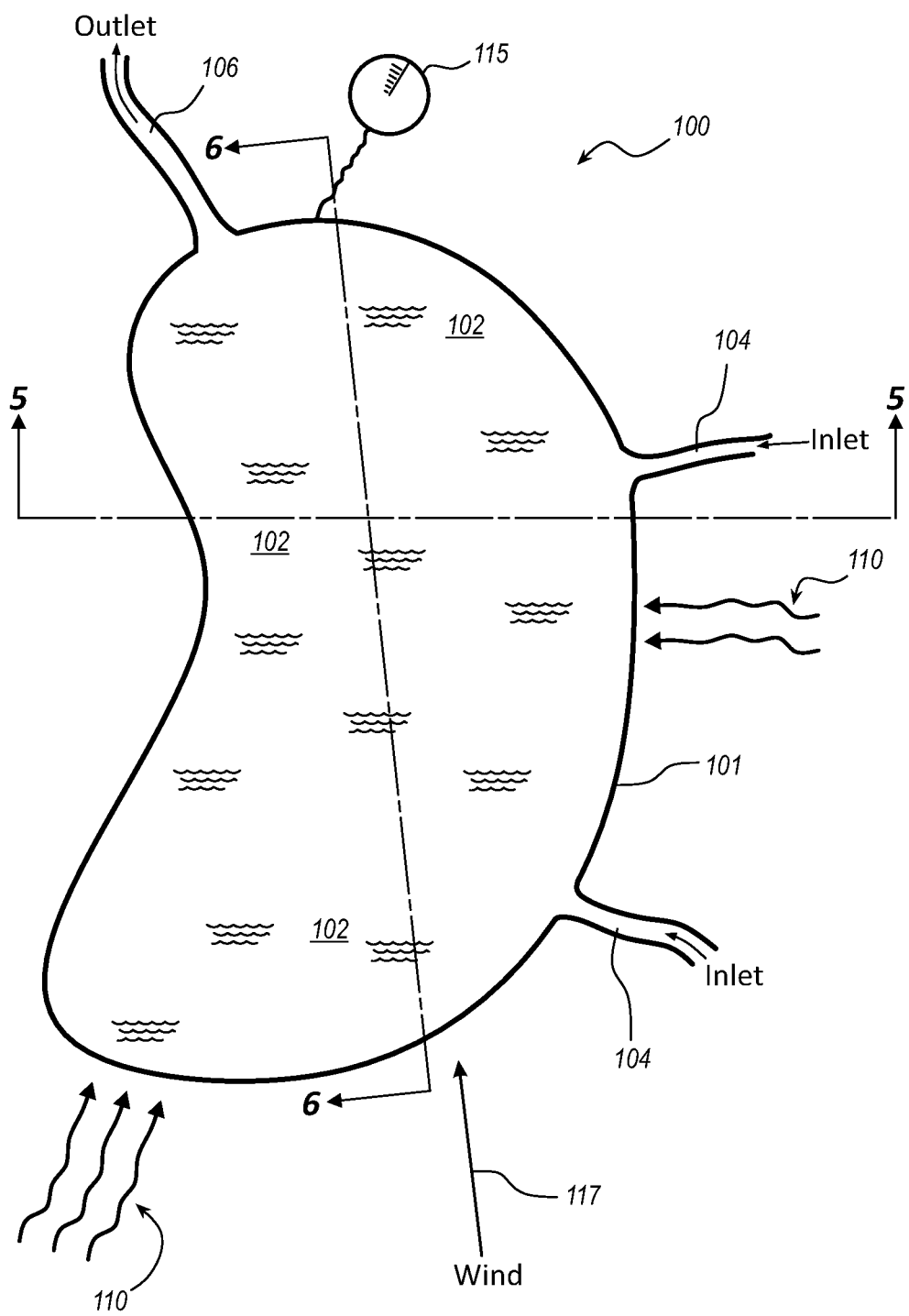
FIG. 4 is a top view illustration of the lake shown in FIG. 1 prior to initiation of restoration of the lake by the lake restoration system of FIG. 1.
Figure 5:
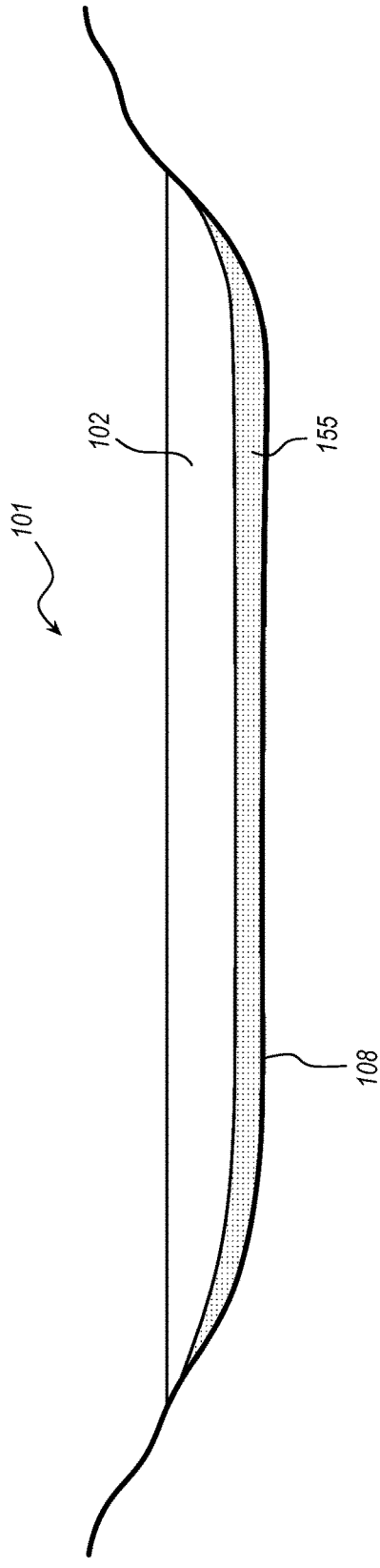
FIG. 5 is a cross-sectional view of the lake of FIG. 4 cut along sectioning lines 5-5.
Figure 6:
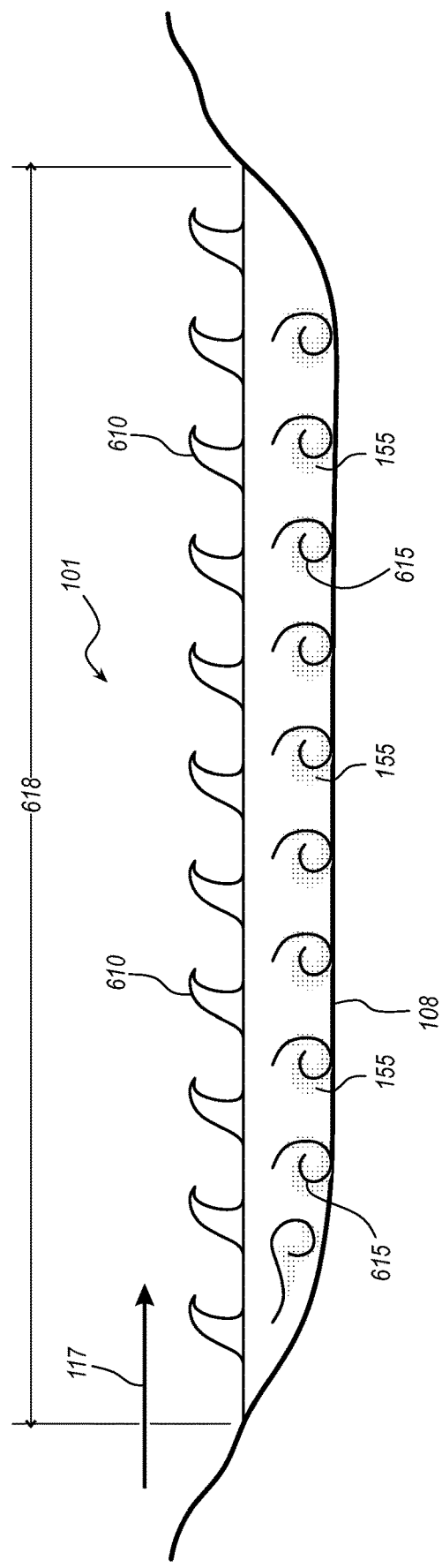
FIG. 6 is another cross-sectional view of the lake of FIG. 4 cut along sectioning lines 6-6.

FIG. 1 is an illustration of a lake restoration system 100 according to one embodiment of the present disclosure. The lake restoration system 100 may comprise a plurality of components or subsystems as shown in FIG. 1. The detailed description of the lake restoration system 100 may be best understood in reference to FIGS. 1-6, where FIGS. 1-3 illustrate a top view and cross-section views of a lake 101 in accordance with lake restoration system 100, and where FIGS. 4-6 illustrate a top view and cross-section views of the lake 101 absent the lake restoration system 100; or in other words, prior to application of the lake restoration system 100.

In the illustrated embodiment, the lake 101 includes one or more inlets 104 and at least one outlet 106. The lake 101 may also include one or more run-off sources of water including storm water from municipal areas. The lake 101 may receive effluent from one or more waste water treatment facilities 115. The lake 101 may also be exposed to wind 117, which may induce waves 610. The lake 101 may comprise a layer of sediment 155 disposed along at least a portion of the lake bed 108.

As illustrated in FIG. 1, the lake restoration system 100 may include one or more dredgers or pieces of dredging equipment 180. The dredging equipment 180 may comprise shovels, scoops, hooks, cranes, pumps, conveyor belts, tubes, or any other suitable mechanism for removing sediments or other materials from the lake bed 108 of the lake 101 and transporting the matter to a different location. In some embodiments, the dredging equipment 180 may include floatation devices (e.g., boats or barges) enabling the dredging equipment 180 to float in the lake water 102 so that structural or supportive contact of the dredging equipment 180 with the lake bed 108 is not necessary to remove matter from the lake bed 108.

The dredging equipment 180 may facilitate one or more of a plurality of components of the lake restoration system 100, as further described below.

Dredging may include one or more of the following:
1. Removing sediments 155 that may be disposed on the lake bed 108 (See FIG. 5).
2. Deepening the lake 101 or increasing the average depth of the lake 101.
3. Changing the lake bathymetry, in other words changing the contour of the lake bed 108.

The sediment 155, which may be deposited on the lake bed 108, may include fine particulate matter in the 150 to 200 micron range with some particulates being finer. This fine particulate matter can become suspended and remain suspended in the water column for long periods of time. Additionally, sediment 155 may include chemical attraction to phosphorus and nitrogen molecules resulting in elevated nutrient levels. The elevated nutrient levels of the sediment 155 may also leach into the upper levels of the lake bed 108 below the sediment 155. The suspension of the sediment 155 may cause elevated nutrient levels within the water column and block light needed to re-establish plants such as littoral zone plants 213. Littoral zone plants 213, such as cattails and lilies, as well as other indigenous native plants and animals, may promote restoration of water clarity and a more balanced lake ecosystem. Submerged and emergent plants may help utilize and/or control nutrients in the lake water 102 and within the sediments 155. Dredging may include removal of the sediment 155 disposed on the lake bed 108 and upper levels of the lake bed 108 to a predetermined depth which may contain elevated levels of nutrients. In some embodiments, dredging to remove sediment 155 from littoral zones 130 may precede the planting of submerged and/or emergent plants in the littoral zones 130.

Dredging may include and/or result in depositing and encapsulating the sediment 155 into geofabric socks also known as geotubes 150. The geotubes 150 may be used to encapsulate, consolidate, and compress the sediment 155 and thereby prevent resuspension of the sediment 155 within the water column. Encapsulation and/or compression of the sediment 155, which may have elevated nutrient levels, within the geotubes 150 may prevent or inhibit leaching of the nutrients from the encapsulated sediments 155 back into the lake water 102 and/or the lake bed 108. Once filled, the geotubes 150 may be placed throughout the lake 101 and/or used to create islands as shown in FIG. 2. In some embodiments, the geotubes 150 may be used to define an outline shape of islands as further described below.

The geotubes 150 may be formed of a geofabric that is porous to allow water to seep out of the geotubes 150 through the tube wall while having pore sizes small enough to retain the sediment 155 within the tube. As such, the sediment 155 can be effectively encapsulated and may be used for structural purposes such as the creation (e.g., forming, building) of islands. Filling the geotubes 150 may comprise pumping a combination of sediment 155 and lake water 102 into the geotube 150 and allowing the lake water 102 to exit the geotube 150 through the porous geofabric, while retaining the sediments 155 within the geotube 150, thereby compressing the sediment 155 within the geotube 150. Once in place and filled with the sediment 155, the geotubes 150 may be secured to the lake bed 108 and/or to each other. The geotubes 150 may be formed of high-density polyethylene (HDPE). A flocculent or biodegradable polymer can also be utilized in connection with the geotube 150 to help encapsulate and sequester finer level sediments.

Removal of sediments 155, which may be fine, nutrient-loaded sediments, may reduce the levels of phosphorus and nitrogen in the water column, especially during wind/wave events. Lower nutrient levels in the water column may result in fewer and less dramatic algal blooms during warmer temperatures. This not only improves water quality, but may also provide for a healthier environment for the restoration of submerged plants, fish, and other aquatic species. The removal of nutrient-loaded sediments 155 may accelerate the restoration of natural nutrient levels ahead of natural biological processes that gradually remove nutrients from the lake bed 108.

Sediments 155 can also be stratified on a lake bed 108. In some instances, the upper few inches to two feet of a lake bed 108 may comprise sediments 155 having fine particulate sizes. The sediments 155 at lower levels may have larger particulate sizes such as sand, gravel, and rock. The sediments 155 at lower levels may also be thicker and/or more solid such as mud. The fine level sediments 155 are disturbed by even small wave events, or at smaller orbital velocities 615. What this means, is that removal and sequestration of fine level sediments 155 can improve water clarity significantly during normal meteorological conditions. Additionally, nutrient loading most often occurs in the top layers of sediment 155. The depth of nutrient loading is based on a variety of factors including the depth of sediments 155 that are resuspended during wind/wave events, how long nutrient loading has occurred, the material composition of the lake bed 108, and other known factors. In one illustrative embodiment, fine level sediments 155 in the upper level, e.g., about the top 8-16 inches of the sediments 155, are resuspended. Nutrient loading occurs not only in these fine level sediments 155, but also in the heavier sediments 155 that are disposed at depths of about 16-24 inches below the top surface of the sediments 155 and that are not typically re-suspended. Depth of nutrient loaded can be determined based on modeling, utilizing core samples, or a combination of both. Composition, stratification, and materials of the sediments 155 can vary significantly over the lake bed 108. As such multiple core samples can provide a more complex insight into desired dredging plans for different portions of the lake 101.

The depth of dredging may vary in different parts of the lake 101, which may be based on data gleaned from core samples and/or engineering design. Some areas may be dredged by as little as 18 inches or less, while other areas may be dredged up to 90 feet or more. Increasing lake depth may reduce the resuspension of the sediments 155 during wind and wave events. In some instances, deepening the lake 101 may create an exponential decrease in the amount of force exerted on the lake bed 108 by wave action, which can disturb the sediments 155 on the lake bed 108. Less suspension of sediments 155 may result in less nutrient pollution within the water column. This, in turn, may result in cleaner, clearer water, and fewer algal blooms. Deepening the lake 101 may also produce an increased thermocline that may produce cooler water temperatures than the water temperatures before deepening. Cooler water is denser and has lower natural movement.

To improve water clarity and water quality, the fine level sediments 155 in the top 8-16 inches are dredged and encapsulated in geotubes 150 designed to sequester the sediments 155 and the associated nutrients so they do not leach back into the lake 101. The geotubes 150 can also be utilized to hold the heavier sediments 155 that are not re-suspended. The heavier lake sediments 155 are then dredged to infill the islands 140, 144, 148 the perimeter being generally formed by the position of the geotube 150. The infill of the islands 140, 144, 148 can also include fine level sediments based on soil compaction engineering design. By removing the majority of fine level sediments 155 from the lake bed 108, and by removing most or all of the nutrient loaded sediments 155 from the lake bed 108, clarity and quality of the lake water 102 are significantly improved. Not only does this reduce sediments 155 and nutrients in the water column, but it also provides for improved light penetration needed for restoring submerged plants to the littoral zones 130. Restoring submerged plants helps to further anchor the sediments 155 to the lake bed 108, reducing resuspension of the sediments 155 and further improving water clarity. Littoral zone plants 213 also utilize phosphorous, nitrogen, and other nutrients further improving quality of the lake water 102. Restored submerged plant communities across the littoral zones 130 also increases the number of zooplankton and minnows that feed on phytoplankton and algae. In this manner, the lake 101 having been restored via the lake restoration system 100 may begin to self-regulate for improved water clarity and water quality. The lake restoration system 100 also restores native species including zooplankton, invertebrates, fish, aquatic species, as well as dependent fish, avian, and terrestrial species in and around the lake 101.

Dredging may also include changing the lake bathymetry (topography of the lake bed 108) and creating deep-water channels 210 to improve circulation and further cool the lake water 102. Such re-contouring of the lake bed 108 may improve natural currents in the lake 101 and reduce stagnation. Increasing the variability in lake depth, may increase the diversity of underwater topography, and introduce greater variability in the lake's thermocline. The changes to lake bathymetry may also better support desirable fish species such as trout and other diverse aquatic species.

Dredging may also include creating deep-water channels 210, which may be up to 60 to 90 feet deep or more. These deep-water channels 210 may produce thermal cooling and create convection currents in the lake 101, improving circulation and resulting in overall cooler water temperatures of the lake water 102. In some instances, improved circulation by natural convection may improve water quality and clarity. Cooler water temperatures and improved water circulation may also help control algae levels.

Deep-water channels 210 may also control wave size and force. When waves traveling across the lake 101 cross a deep-water channel 210, the energy of the wave may naturally dissipate reducing the height of the wave. Deep-water channels 210 may also provide a place for re-suspended sediment 155 to settle. At depths up to 60 to 90 feet or more, the sediments 155 may be less likely to re-suspend and may be stored at substantially colder water temperatures where they may not contribute to algal blooms. In summary, the addition of contouring and deep-water channels 210, through dredging, may improve water circulation, decrease water temperatures, reduce the likelihood of algal blooms, reduce wave action across the lake 101, and provide a more natural and diverse environment for fish and other aquatic species.

Dredging may also include and/or facilitate the creation of islands. Islands of various sizes and shapes may satisfy multiple conservation, restoration, and/or development purposes, for example:

Wind/wave breaks
Added shoreline
Protection of littoral zones
New and enhanced habitat for aquatic and terrestrial species
Improved recreation possibilities
Safe harbors during wind events and storms
Containment and breakup of ice
Reduction in surface area and evaporation
Sequestering sludge and sediments
Creation of new property (real estate)
Funding source(s) for conservation efforts to restore and improve the lake Creation of islands creates additional shoreline. Areas surrounding the islands may also include additional acreage of littoral zones 130 planted with littoral zone plants 213 extending into the lake 101. Additional littoral zone plants 213 may provide additional fish habitat and waterfowl areas. Islands may also be planted with native trees, shrubs, bushes, and grasses that will grow into natural forests for the public to explore and enjoy.

The lake 101 may include different island types, such as: estuary islands 140, recreation islands 144, and development islands 148, as further described below.

Estuary or barrier islands 140 may be configured to protect the inner shoreline of the lake 101 and allow for the creation of additional littoral zones 130. Estuary islands 140 may form or otherwise act as barriers to wind/wave events and may also provide protection of the outer shoreline of the lake from the flow of ice. Estuary islands 140 may also create additional miles of island shoreline for birds, riparian plants, and provide a place for littoral zone plants 213 to become reestablished. Inner waterways between estuary islands 140 and the lake's shoreline may provide protected areas for native fish and for the feeding, nesting, and brood rearing of waterfowl.

Recreation islands 144 may be sized and positioned to act as wind and wave breaks across the lake 101. The Recreation islands 144 may have an arched configuration that may create protected boating areas (e.g., safe harbors) during storms and wind/wave events. An arched configuration of a recreation island 144 can also provide a bay where ice flows can congregate and melt during the late winter and early spring. This helps reduce the volume of ice that accumulates on the estuary islands or shoreline.

Recreation islands 144 may also be designed to provide a more diverse lake experience for the public. For example, recreation islands 144 may also include protected bays and coves, allowing boaters to enjoy the lake 101 for longer periods of time throughout the day, as well as docks and other locations for shoring boats, including sailboats. Recreation islands 144 may also include beaches for playing, pavilions for picnicking, overnight campgrounds, and cabins to provide increased recreational opportunities on the lake 101.

Development islands 148 may be designed for living, working, and recreating in harmony with the surrounding watershed. Housing, business, commercial, and entertainment centers may be included to focus on community-centered living. Development islands 148 may include parks, trails, waterways, and other open spaces that traverse and intersect the islands. Development islands 148 may include design aspects centered around protecting and preserving the watershed and health of the lake 101. In this way, development islands 148 may support a continued restoration and natural maintenance of the lake 101. Development islands 148 may also provide real estate, which may be sold and thus provide a mechanism for funding a lake restoration project and may also provide tax revenue.

The lake restoration system 100 may include equipment and systems to provide for human habitation on the development islands 148. Such equipment and systems may include equipment and systems for structure erection, water and sewer handling, electricity and gas distribution, garbage collection, and wired and wireless communication.

The lake restoration system 100 may include one or more bridges 149 extending between the surrounding area of the lake 101 and one or more of the islands 140, 144, 148. Bridges 149 may also extend between the one or more of the islands 140, 144, 148. The bridges 149 may provide for motor vehicle, bicycle, and pedestrian traffic. As such, the lake restoration system 100 may include equipment and/or systems common to the construction of the bridges 149.

In some instances, the islands 140, 144, 148 may be created from dredged material. Some lakes may comprise a substantial volume of sediment 155 and other dredged materials. The creation of islands may provide a place to relocate and retain the sediment 155 and dredged materials.

The geotubes 150 may form a structural portion of one or more of the islands 140, 144, 148. In some embodiments, the geotubes 150 may be used to define a perimeter of an island and hence, establish a structural border around the island. The geotubes 150 may therefore provide a barrier so as to contain and/or surround dredged material, which may be used to fill in and build up the island. In other embodiments, the geotubes 150 may define only a partial perimeter or border of an island. Upon completion of the island, the geotubes 150 may be buried or partially buried with dredged material and/or other landscape materials (e.g., gravel, rock, sand). Burying the geotubes 150 may further aide in driving the lake water 102 from the geotubes 150 and compressing the sediment 155 within the geotubes 150.

The illustrated embodiment of the lake restoration system 100 may comprise compacting equipment 281 for compacting the sediment 155 and/or other dredged materials used in building one or more of the islands 140, 144, 148. The compacting equipment 281 may comprise one or more methodologies of compaction, including conventional rolling, impact rolling, rapid dynamic compaction, and dynamic compaction. The compacting methodology may be defined by at least one of the intended use of the island area, soil composition, engineering studies, and building standards. In some embodiments, building structures may require the deep compaction capability of the dynamic compaction while forested areas, for example, may only require the shallow compaction capability of conventional rolling.

The illustrated embodiment of the lake restoration system 100 may also comprise one or more vertical drains 184 disposed on one or more islands 140, 144, 148 to drain or otherwise dewater the dredged materials that infill the island border formed by the filled geotubes 150. The vertical drains 184 may comprise a vertical opening comprising a perforated or porous wall vertically disposed within the dredged materials of an island. The vertical drain 184 may be premanufactured as a rigid perforated tube formed of high-density polyethylene or any other suitable material. A plurality of vertical drains 184 may be spaced apart in various patterns depending soil type, water content, depth, etc. The vertical drains 184 may also include a sock, or fabric liner to prevent soil, mud, sand or other material from blocking or clogging the perforations ensuring water can enter to the interior of the vertical drain 184. The vertical drains 184 may extend from the surface of the island to the bottom of the island fill material. The vertical drains 184 may facilitate dewatering of dredged island materials in preparation for compaction.

Dredging may also create littoral zones 130. A littoral zone 130 may comprise a portion of the lake 101 having a depth up to about 15 feet such that light can penetrate from the surface of the lake water 102 to the lake bed 108. A littoral zone 130 may be located along a shoreline or may be located inward away from a shoreline. The islands may create additional shorelines suitable for littoral zones 130. A littoral zone 130 may also occur anywhere that is shallow enough for light to reach the bottom of the lake 101 or submerged plants in the lake 101.

In some cases, a littoral zone 130 may include littoral zone plants 213 that may process phosphorus and other nutrients so as to provide food and habitat for zooplankton, fish, invertebrates, birds, and aquatic species. Healthy littoral zone plants 213 may anchor the lake bottom during wind/wave events, regulate nutrient levels, and control phytoplankton numbers.

Littoral zone plants 213 provide habitat for zooplankton and native minnow species that feed on phytoplanktons. Zooplankton breed, seek protection, and thrive in the cover of littoral zone plants 213. Tiny minnows generally consume large quantities of phytoplankton. In turn, larger fish rely on these smaller species. Some species of fish may feed almost entirely on zooplankton. Other species, such as trout, may feed on minnow species and other endemic fish. As such, zooplankton, minnows, and other fish may benefit from littoral zones 130. Littoral zones 130 may also provide habitat for invertebrates, such as mollusks, which may naturally filter the lake water 102 and thereby increase water quality.

The contouring of the lake bed 108 and the building and placement of the islands 140, 144, 148 may reduce the height of waves when the lake 101 is exposed to the wind 117 (e.g., when the wind 117 arises on and/or above a surface of the lake 101). In some embodiments, the lake restoration system 100 may comprise islands 140, 144, 148 that break up or disturb wind patterns. As such, an influence or effect of the wind 117 on the surface of the lake 101 may be reduced, and thereby the islands 140, 144, 148 can reduce the height of the waves. The lake restoration system 100 may comprise the strategic placement of the islands 140, 144, 148 so as to protect portions of the lake 101, such as littoral zones 130, from powerful and/or large waves induced by the wind 117 that may cause damage to the lake 101 and/or lake bed 108.

The placement of one or more of the islands 140, 144, 148 may reduce fetch lengths across the lake 101. A fetch length may be a length of exposed lake surface between opposing shorelines along the direction of the wind 117. FIG. 3 illustrates the shorter fetch lengths 318 disposed between shorelines, including between shorelines of the one or more islands 140, 144, 148, such that the fetch lengths 318 are shorter than the fetch length 618 extending the length of the lake 101 as illustrated in FIG. 6. In other words, in the illustrated embodiment, the lake restoration system 100 has effectively divided the longer fetch length 618 of FIG. 6 into multiple shorter fetch lengths 318.

Reducing the size and power of waves, may facilitate the lake 101 becoming an enhanced destination for sailing, water sports, fishing, and other recreational activities. A reduction in the size and power of waves may also improve the safety of recreational activities on the lake 101 and potentially saves lives. It may also facilitate restoration of the quality of the lake water 102 and enable the restoration of native submerged plats in littoral zones 130 and indigenous aquatic and terrestrial wildlife species that rely on littoral zone plants 213 for food and habitat.

As illustrated in FIG. 6, waves on the surface of a lake 101 may also produce orbital velocity 615 beneath the surface of the lake 101, which may in turn cause resuspension of sediment 155. The orbital velocity 615 decreases with depth or distance from the surface. As such, the effects of the orbital velocity 615 on the lake bed 108 decreases with depth of the lake 101. Increasing the depth of the lake 101 through dredging in combination with reducing wave height may reduce the orbital velocity 615 or the amount of force a wave action may exert on the lake bed 108, resulting in reduced resuspension of sediment 155 and enhanced quality of the lake water 102 of the lake 101. Reducing orbital velocity 615 may facilitate the rooting of littoral zone plants 213 and enable the restoration of native submerged plants in littoral zones and indigenous aquatic and terrestrial wildlife species that rely on littoral zone plant species for food and habitat. By reducing orbital velocity 615 and the resulting forces on the lake bed 108, resuspension of the sediments 155 within the water column may be prevented, inhibited or significantly reduced.

The lake restoration system 100 may include one or more subsystems to improve the quality of the lake water 102 and/or the quality of the water entering the lake 101. Effluent water from surrounding waste treatment facilities may be a source of nitrogen and phosphorus entering the lake 101. Phosphorus, nitrogen, and total dissolved solids accumulation may contribute to excessive nutrient loading of lake sediments 155. Upgrading the waste water treatment facilities 115 may reduce the levels of phosphorus and nitrogen entering the lake 101 and therefore reduce the levels of phosphorus and nitrogen in the lake water 102. The Environmental Protection Agency (EPA) has also recognized the importance of minimizing nitrogen, phosphorus, and other total dissolved solid levels in treated water from waste treatment facilities. A proposed new EPA standard (Tier 1-N) dictates that waste water treatment facilities should limit their outflows to 0.1 milligrams per liter (mg/L) for total phosphorus and 10 mg/L for total nitrogen.

The lake restoration system 100 may include a subsystem for removing phosphorous from inflows into the lake, such as waste water treatment effluent. The subsystem for removing phosphorous may comprise, but is not limited to, one or more of the following: phosphorous precipitation, phosphorous adsorption, phosphorus ion exchange and enhanced biological phosphorus removal.

The lake restoration system 100 may include a subsystem for removing nitrogen from inflows into the lake, such as waste water treatment effluent. The subsystem for removing nitrogen may comprise, but is not limited to, one or more of the following: Biological Nutrient Removal (BNR), Enhanced Nutrient Removal (ENR), and the Limit of Technology (LOT). Biological Nutrient Removal systems typically comprise combinations of aerobic, anoxic, and anaerobic processes which facilitate biological denitrification via conversion of nitrate to nitrogen gas. Biological systems can also involve retention ponds which utilize algae to utilize and remove nitrogen and/or phosphorous. Biological based systems often involve removal of algae and wasting of sludge. Enhanced nutrient removal typically uses BNR with chemical precipitation and granular media filtration to achieve lower effluent nitrogen values. Lowest effluent concentrations can be achieved using chemical addition and filtration technologies which can involve advanced effluent membrane filtration, ion exchange, and or adsorption processes.

Run-off water inflows 110 from storm water systems and farming/ranching land may be another source of phosphorus, nitrogen, and biologics entering the lake 101. As such, the lake restoration system 100 may include buffering type approaches such as biofiltration mechanisms 176 for improving filtration of run-off water inflows 110 before it enters the lake 101. The biofiltration mechanisms 176 may comprise bioretention basins and/or bioswales to capture and/or biofilter untreated water.

In some embodiments, bioswales and/or bioretention basins may facilitate some of the run-off water inflows 110 to replenish the groundwater supply. As water infiltrates through the biobasins, sediment and pollutants may be filtered. Microorganisms on plant roots and in the nearby soil may help to further break down harmful pollutants before any excess water is returned to the lake 101.

Bioswales may be channels designed to concentrate and guide run-off water inflows 110 while removing debris and pollution. Bioswales can also be beneficial in recharging groundwater. A bioswale may be vegetated, mulched, or xeriscaped. They may consist of a swaled drainage course with sloped sides.

A bioretention basin may facilitate removal of contaminants and sedimentation from run-off water inflows 110. Run-off water inflows 110 may be collected into the treatment area, which consists of a grass buffer strip, sand bed, ponding area, organic layer or mulch layer, planting soil, and plants. Run-off water inflows 110 may pass over or through a sand bed, which slows the run-off's velocity, distributes it evenly along the length of a basin area, which may consist of a surface organic layer and/or groundcover and underlying soil.

The lake restoration system 100 may include one or more circulation pumps 160. The circulation pumps 160 may be disposed at various locations within the lake 101. As shown in FIG. 1, in some instances, the lake 101 may receive inflow from inlets 104 along one side of the lake 101, which may provide for current along the one side of the lake 101 toward the outlet 106, which, in turn, may cause other portions of the lake water 102 to be relatively stagnant, such as along the opposite side of the lake 101. As a result, the stagnant portions may develop a higher degree of salinity relative to less stagnant portions of the lake 101. As such, one objective of the lake restoration system 100 may be to improve water circulation throughout the lake 101 through mechanical pumping.

Selection of circulation pumping sites may be based on several factors including lake bathymetry, dissolved oxygen, nitrogen and phosphorus concentrations, algal counts, land use practices, and nutrient loading rates, for example. Mechanical circulation pumping may be utilized to improve flow rates in and around the islands to ensure lake water 102 is guided from inlets 104 to each part of the lake 101. The circulation pumps 160 may be solar powered pumping systems and may be designed to move up to 10,000 gallons or more of water per minute. The circulation pumps 160 may also provide aeration of lake water 102.

In some embodiments, the circulation pumps 160 may comprise a vertical flow path extending substantially from the surface of the lake 101 to the lake bed 108 and one or more paddles rotating about a vertical axis. In some instances, stagnant and/or deep-water may be drawn into and up through the vertical flow path and further into rotating paddles, which may rapidly gyrate the water, adding energy and movement, which is then released back into the lake water 102. The increased water circulation resulting from the circulation pumps 160 may assist in inhibiting algal blooms and other water quality problems. The mixing action of the circulation pumps 160 may also promote diatom and zooplankton while, at the same time, limiting and preventing impacts of algae.

The placement of the circulation pumps 160 may be determined using advanced computer modeling 700 of the lake 101 to determine where water quality deficits have developed, or could develop, as a result of poor water circulation. The circulation pumps 160 may be placed at or adjacent to the identified areas of poor circulation in coordination with the strategic placement and design of the islands 140, 144, 148, deep-water channels 210, and other changes in the lake's bathymetry to improve circulation of the lake water 102. One objective of the circulation pumps 160 may be to move inflowing waters to the stagnant portions of the lake 101. The circulation pumps 160 may also move stagnant waters into areas of the lake 101 adjacent to the pumped biofiltration systems 164, where lake water 102 may be filtered and cleansed as further described below. The circulation pumps 160 may also assist the littoral zone plants 213 as a biofiltration mechanism.

The lake restoration system 100 may comprise one or more pumped biofiltration systems 164 around the lake 101 to restore and improve the water quality. The biofiltration systems 164 may pump water onto constructed streambeds in areas surrounding the lake 101 or on the islands 140, 144, 148. In some embodiments, the pumped biofiltration systems 164 may each process up to 250,000 gallons per hour. As the lake water 102 flows through these specially-designed rivers, filtration media such as gravels, plants, and aquatic life may purify the water, balance nutrient and acidity levels, and oxygenate the water before it is returned to the lake 101. Each pumped biofiltration system 164 may appear as a natural stream coming out of rocks and running for up to ½ mile or more before it returns water to the lake 101.

The pumped biofiltration systems 164 may treat the water for phosphorus, nitrogen, acidity, depleted oxygen, total dissolved solids, bacteria, and other water quality measures. Biofiltration media may be constructed using natural materials such as shredded palm tree or coconut husks, for example. Such biofiltration media may retain sufficient air in their membranes to float and support the growth of aquatic and riparian zone plantings that may contribute to naturally filtering the water. The pumped biofiltration systems 164 may also function by removing nutrients and pollutants through biofilm contact with specially selected native plant roots. The pumped biofiltration streambeds may be lined with a water barrier such as a polyuria-lined geofabric, for example, so as to inhibit loss of water to the surrounding soils. The biofiltration media may also comprise mollusk populations, which may be native to the lake 101. Native mussels, snails, and clams may process large volumes of lake water 102 in relatively short periods of time. They may further refine the lake water 102 by filtering out suspended solids, nutrients, and other contaminants from the lake water 102.

In some embodiments, the biofiltration pumps may be solar powered and may include variable frequency drives that can output from about 100 gallons per minute up to more than 4,000 gallons per minute. The pumped biofiltration systems 164 may comprise water quality monitoring sensors at the inlet and/or outlet of the biofiltration system 164 to measure and assess performance. The pumped biofiltration systems 164 may be semi-autonomous and may startup and shutdown via readings from one or more water quality sensors spread around the lake 101 including adjacent to inlets of the pumped biofiltration systems 164.

In some instances, the lake 101 may benefit by resolving deficits of dissolved oxygen in the lake water 102. When water sits and stagnates, it loses oxygen and becomes increasingly acidic through an anaerobic bacterial process. This anaerobic bacterial process releases toxic gases, including hydrogen sulfide, ammonia, carbon dioxide, and methane into the water column. These gases are all toxic to fish, insects, and beneficial bacteria.

The lake restoration system 100 may include one or more aeration systems 168 to counteract low dissolved oxygen levels. The aeration systems 168 increase dissolved oxygen in the water column and improve water quality. The aeration systems 168 may turn water over and bring foul-smelling gases to the surface where they are neutralized by the atmosphere. Oxygenated surface water may then be circulated back to the bottom of the lake 101 where the oxygen kills anaerobic bacteria that produce toxic gases. The aeration systems 168 may also dispose blue-green algae to the lake bed 108 where it cannot bloom due to lack of sunlight. By aerating problem areas, iron and manganese oxide may sink and be deposited on the lake bed 108. Both oxidized iron and manganese are useful in binding phosphorus and nitrogen to the lake bed 108. As such, the phosphorus and nitrogen may not be available for algal growth.

The aeration systems 168 may comprise an air compressor located along the shoreline and a tube disposed along the lake bed 108 and extending into the lake 101. The aeration system 168 may pump air through the tube and out through a plurality of pores along the length of the tube and/or at the end of the tube. As such, the aeration systems 168 may provide a source of small air bubbles at the lake bed 108 that, at least partially, dissolve into the lake water 102, adding oxygen to the lake water 102.

In some embodiments, the aeration systems 168 may use solar power, and may increase dissolved oxygen levels in the lake water 102 from about 3 (mg/L) up to 7 mg/L or more. Scientific studies suggest that 4-5 mg/L of dissolved oxygen is the minimum amount that will support a large, diverse fish population. The dissolved oxygen level in great fishing waters generally averages about 9 mg/L, while good trout habitat maintains at least 7 mg/L.

The use of 3D modeling simulations and water testing before implementation of the lake restoration system 100 may indicate where on the lake 101 areas of low dissolved oxygen may likely be. The aeration systems 168 will be located and operated in the deeper deep-water channels 210 and/or other areas where testing may indicate a need for greater oxygenation. The aeration systems 168 may be electronically controlled with variable frequency drive compressor stations that operate at different levels in accordance with dissolved oxygen measurements taken at strategic locations around the lake 101. The aeration systems 168 may enhance control over growth of blue-green algae as well as maintain healthy dissolved oxygen levels for native fish. Over time, as the littoral zones 130 become reestablished, dissolved levels from littoral zone plants 213 may produce a significant portion of the dissolved oxygen needs of the lake 101. As such, the aeration systems 168 may operate at lower levels or may only operate at certain times of the year, for example, in the late fall to maintain desired oxygen levels.

Figure 7:
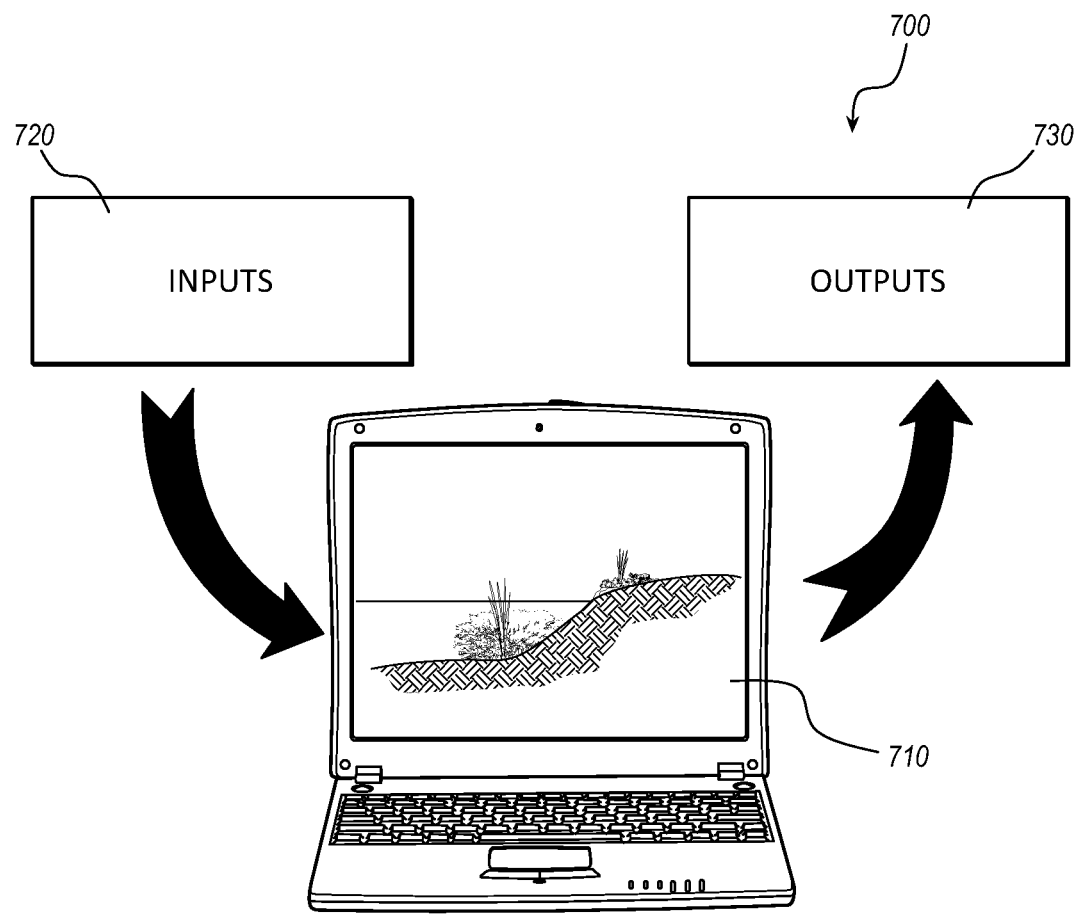
FIG. 7 is an illustration of the computer model components of the lake restoration system of FIG. 1.

The lake restoration system 100 may include a computer model 700 as illustrated in FIG. 7. The computer model 700 may provide predicted characteristics of the lake 101 as may be present after the implementation of one or more components of the lake restoration system 100 based on one or more algorithms 710. The computer model 700 may receive a plurality of inputs 720 and produce a plurality of outputs 730 in accordance with the algorithms 710. In one embodiment, the plurality of inputs 720 may include data associated with physical attributes of the lake 101 and environmental conditions such as length and width of the lake 101, one or more fetch lengths 318, 618 across the surface of the lake 101, depth of various portions of the lake 101, island location and size, and wind direction and speed, for example. The plurality of outputs 730 may then comprise predictions regarding the height of waves at various locations on the lake surface and the magnitude of orbital velocities at various locations along the lake bed 108, for example. In another embodiment, the computer model 700, may further incorporated. Other outputs 730 can comprise predictions regarding increased circulation at desired locations around the lake, improved oxygenation, reduced water temperatures, reductions in evaporation levels, increases in water clarity, or reductions in lake turbidity at various locations around the lake for example.

Figure 8:
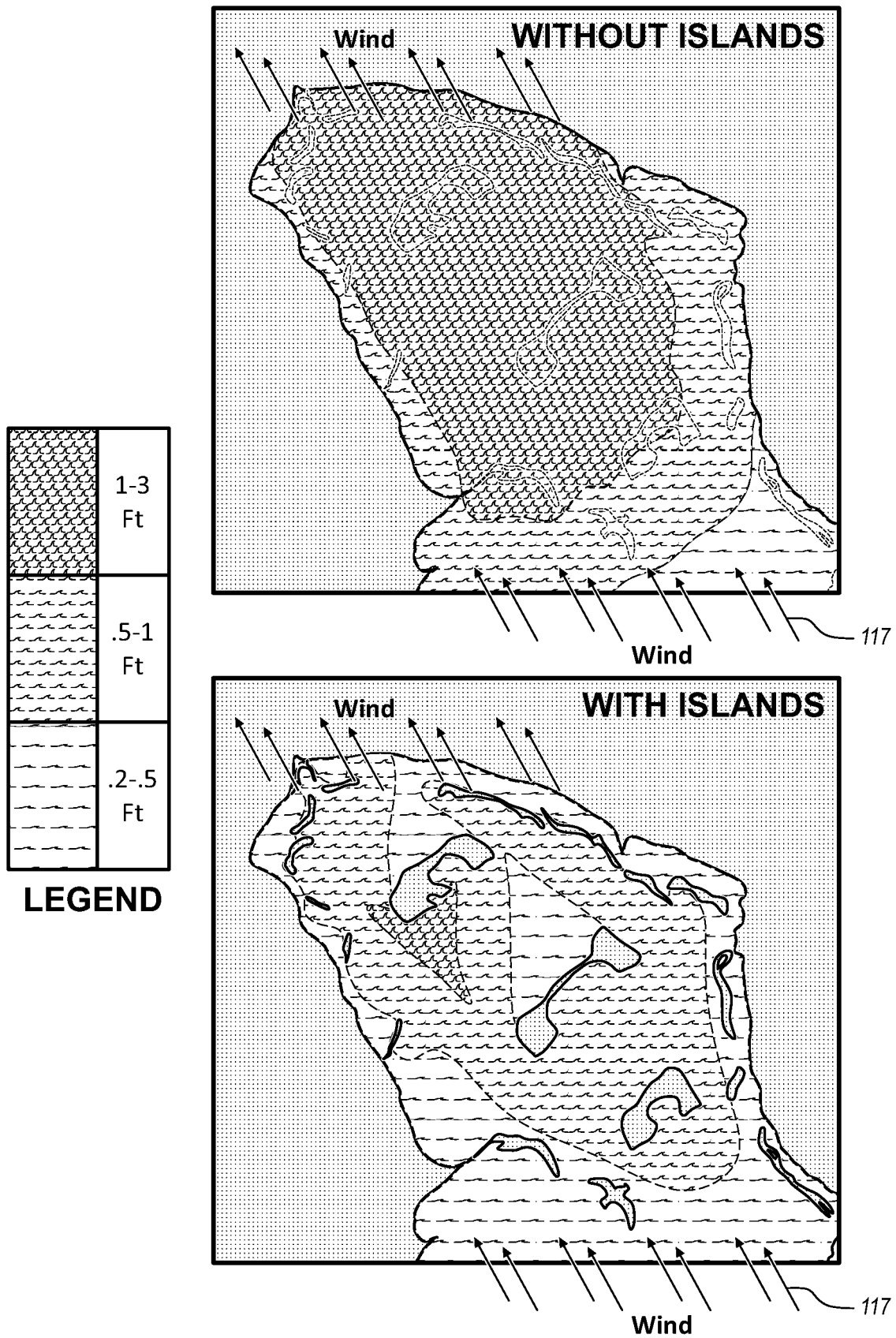
FIG. 8 is an illustration of effects of island placement on wind induced waves on a modeled lake surface.

FIG. 8 illustrates the reducing effect that the placement of islands may have on wave strength/height according to a computer model 700 of the lake 101. Shown are two illustrations of a computer generated lake model with and without the presence of islands. The predicted magnitude of the waves is illustrated at various locations on the lake surface when the lake 101 is exposed to the wind 117 as indicated. The different magnitudes of the waves are visually indicated by the density and height of the illustrated waves. Also shown in FIG. 8 is a legend indicating exemplary wave height ranges corresponding to the visually indicated wave magnitudes in the illustrations. As shown, the computer model 700 predicts a significant decrease in wave magnitude when the islands are present as opposed to when the islands are not present. Quantitatively, the computer model 700 results indicate that the islands reduce wave height by 60% across the lake 101 during a 26 mile-per-hour wind event.

Reducing wave height and increasing lake depth through dredging may create a reduction in the amount of force wave action exerts on the lake bed 108. When wave height is reduced and lake depth is increased, the combined effect produces a significant reduction in forces exerted on the lake bottom by wave action.

The following mathematical formula predicts how wave height and lake depth change the amount of force (orbital velocity 615) that waves exert on the lake bed 108.

$$w = \frac{pH}{T} \times e^{kz} \times \sin(kx \pm \omega t)$$

The variables in the equation above are:
w=orbital velocity (m/s±1)
p=constant
H=wave height (m)
T=wave period (s)
k=wave number (2p/L; m±1) L=wave length (m)
z=depth of observation (negative in the column; m)
x=point or place of observation of the wave (m) in the horizontal direction
ω=radian wave frequency (2p/T; s±1)
t=time of observation(s)

According to the equation, if the wave period and the wave number variables remain constant, then the variables that affect the orbital velocity 615 are (1) H-wave height and (2) z-depth of lake. The term sin(kx±wt) is the periodic component of wave velocity and a function of the natural variability of forces within a wave. The periodic component has a (periodic) maximum at values of x equal to 0.25 L and 0.75 L, between crest and trough when the elevation of the water surface is zero. The periodic component becomes less influential to change orbital velocity 615 as the depth of the water increases. Hence, changes to the height of the waves and the depth of the lake 101 may have the greatest effect on orbital velocity 615 and, therefore, provide the greatest opportunities for controlling and/or reducing the orbital velocity 615.

According to the equation, at an exemplary average depth of nine feet, the most important variables affecting the orbital velocity 615 are H-wave height and z-depth of the lake. This shows that a decrease in wave height produces a linear decrease in orbital velocity 615, while an increase in the depth of the lake 101 produces an exponential decrease the orbital velocity 615.

For example, wind and wave models, along with deepening the lake 101, may estimate that after dredging has been completed and islands have been created, wave forces on the lake bottom 101 may be reduced by up to 500% or more during a modeled exemplary 26 mile-per-hour wind event, which in turn would predict little or no resuspension of the sediment 155 from the lake bottom 101 and thus a marked improvement in water clarity. The resulting reduced orbital velocity 615 may also sufficiently decrease the degree of induced vertical force so as to inhibit uprooting, breaking or otherwise damaging aquatic plants, significantly improving successful reestablishment of submerged plants along the lake bottom. In summary, wind and wave action, as well as lake bottom disruption, will be reduced as a result of strategic dredging and island creation, thus allowing the lake to transform the lake water 102 from a turbid eutrophic state to a restored clear-water state.

Figure 9:
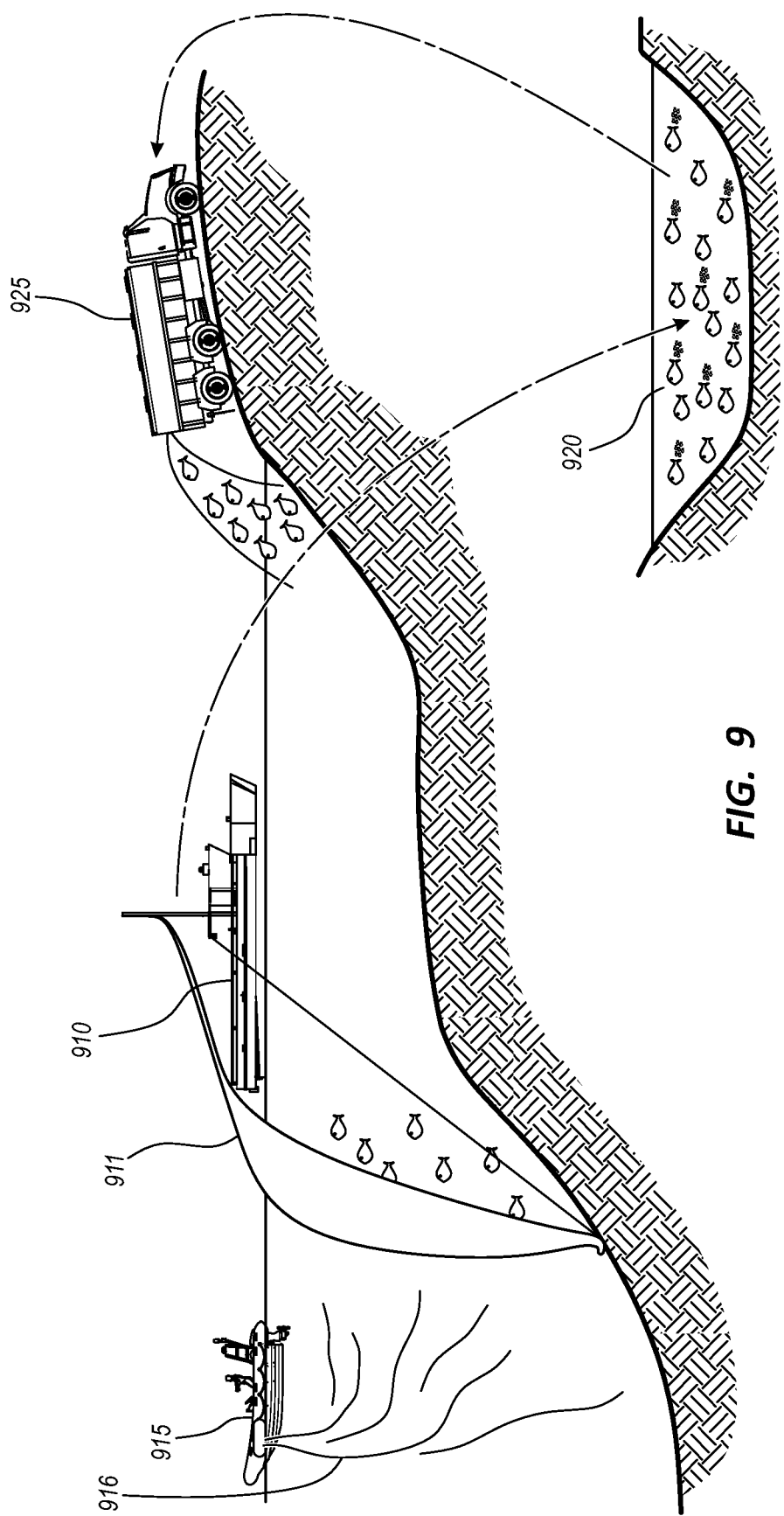
FIG. 9 is an illustration of a fish restoration system and process.

In some instances, non-native fish may have been introduced into the lake 101, which may have competed with native fish and caused a decrease in native fish population. As shown in FIG. 9, the lake restoration system 100 may comprise fish eradicating equipment and/or subsystems 915 configured to eradicate the non-native fish species from the lake 101. In some instances, removal of non-native fish may require the temporary removal of all fish in the lake 101. In some embodiments, the fish eradicating equipment or subsystem 915 may include a fish removal compound 916 and delivery equipment configured to introduce the fish removal compound 916 to the lake water 102.

In some instances, the lake 101 may also be the only location (home) for one or more native fish. In such cases, these native fish may need to be collected from the lake 101 prior to the removal of all fish in the lake 101. Hence, in some embodiments, the lake restoration system 100 may comprise fish collecting equipment 910, which may include a net 911 capable of catching the native fish or an electric shocker capable of temporarily stunning the fish, which may then be retrieved from the surface of the lake 101. The lake restoration system 100 may also comprise fish raising equipment 920 such as equipment common to a fish hatchery for the preservation and/or raising of native fish. The lake restoration system 100 may also include fish introduction equipment 925, which may comprise a truck with a tank capable of transporting fish to the lake 101. The tank may also comprise a port configured to release fish from the tank into the lake 101.

In some embodiments, the lake restoration system 100 may be associated with a portion of a lake (body of water) such as a bay or a lagoon. In such embodiments, the lake restoration system 100 may separate or isolate the portion from the lake. As such, a separation structure may be formed from dredged material from the lake bed 108, which may include sediment 155 disposed within geotubes 150. In some embodiments, geotubes 150 filled with sediment 155 may provide structure to a shoreline surrounding the lake 101 or other portions of the lake bed 108 not associated with an island or a shoreline.

In one embodiment of the present invention, the bay or lagoon can be used to maintain and grow endemic fish species, such as the June Sucker, while treatment of the remainder of the lake 101 is undertaken. In this way, healthy populations of endemic species can be maintained both in a sequestered portion of the lake 102 as well as in a fish hatchery 920 (see FIG. 9). Once removal of invasive species from the lake 102 has been completed and habitat for fish and zooplankton has been started, endemic species such as the June Sucker can be re-established in the lake 102 and restored to healthy population levels and potentially even closer to historic population numbers.

The lake restoration system 100 may also comprise equipment and processes common to the restoration and/or introduction of wildlife in addition to fish that may or may not have once inhabited the lake 101 and/or areas surrounding the lake 101. Such wildlife may include, but not be limited to, birds including waterfowl, mammals, aquatic species, aquatic insects, terrestrial species, reptiles, and amphibians.

Figure 10:
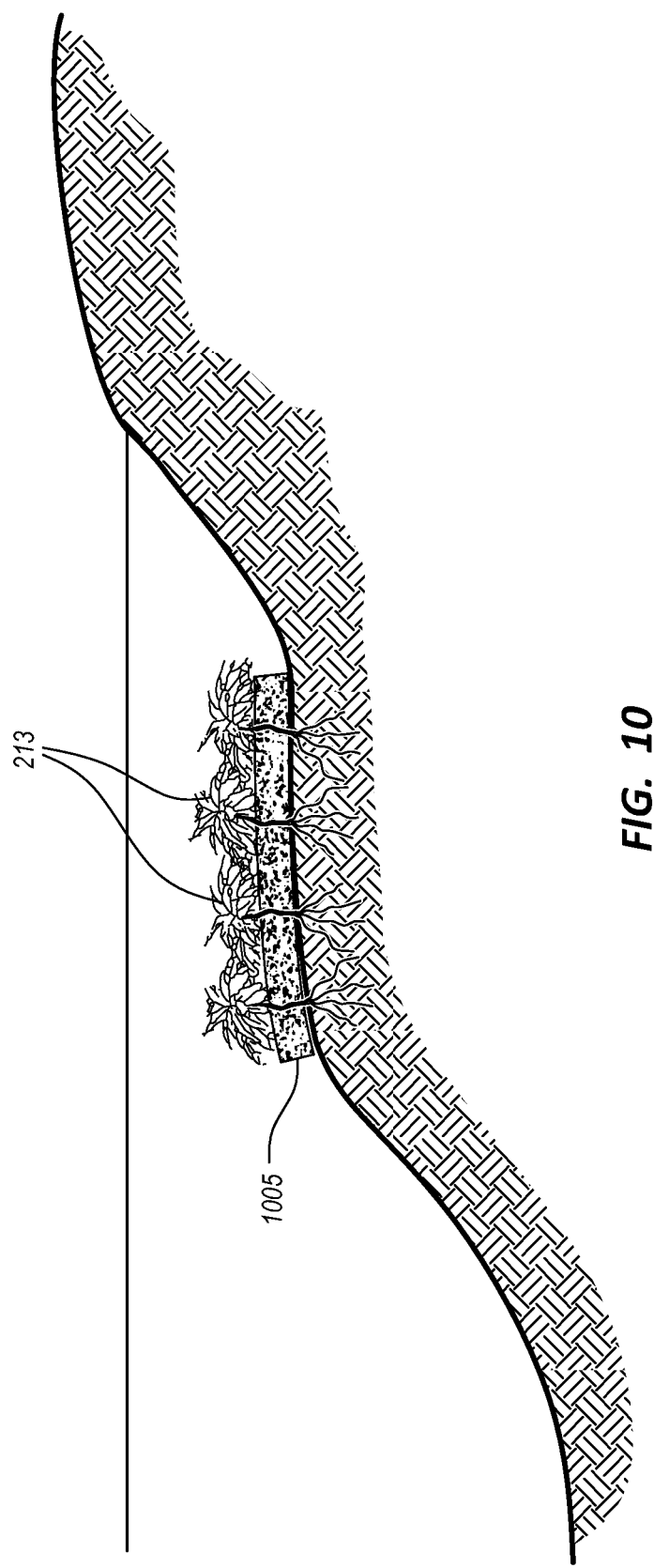
FIG. 10 is an illustration of a littoral zone restoration system and process.

In some embodiments, the lake restoration system 100 may include one or more planting mats 1005 as illustrated in FIG. 10. The planting mats 1005 may be formed of a porous fabric, which may be fixed to the lake bed 108 within a littoral zone 130. The planting mats 1005 may cover an area of a littoral zone 130 and thereby protect or secure the portion of the lake bed 108 beneath the planting mat 1005. The planting mat 1005 may comprise a plurality of openings through which littoral zone plants 213 may be disposed. The planting mats 1005 may also be formed of a biodegradable material configured to disintegrate into the lake water 102 as the littoral zone plant 213 starts take root in the lake bed 108. As such, littoral zone plants 213 may be planted by extending the roots of the littoral zone plants 213 through the opening in the planting mat 1005 and into the lake bed 108 beneath the planting mat 1005 and allowing a top portion of the littoral zone plant 213 to extend above the planting mat 1005. Planting littoral zone plants 213 in this manner may protect the littoral zone plants 213 from being uprooted or otherwise damaged during wind/wave events.

Figure 11:
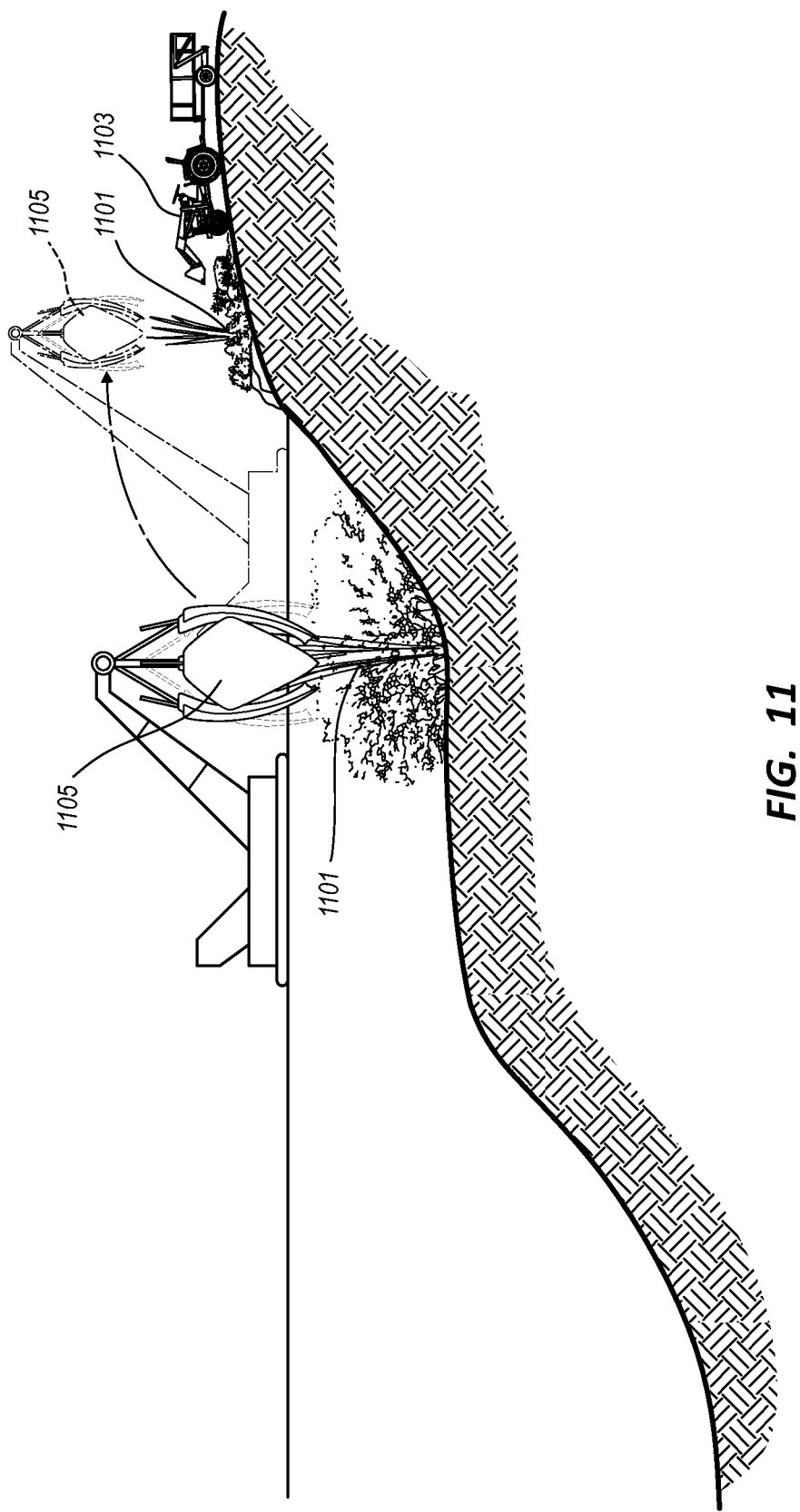
FIG. 11 is an illustration of a shore line plant restoration system and process.

In some instances, invasive plant species may have overcome native plants, resulting in the invasive plant species occupying emergent and riparian zones surrounding the lake 101. As such, in some embodiments as shown on FIG. 11, the lake restoration system 100 may comprise plant removal or eradicating equipment 1103 configured to remove invasive plants, and plant introduction equipment 1105 configured to plant native plants 1101 in emergent and riparian zones. The plant removal equipment 1103 may comprise tractors such as a backhoe capable of digging up the roots of invasive plants. Other plant removal equipment 1103 may include a herbicide sprayer and/or propane torch to kill, burn, or otherwise destroy the invasive plants. Plant introduction equipment 1105 may include manual hole digging tools such as a shovel for smaller plants and/or powered augers for larger plants. Automated and/or semi-automated planting equipment are also within the scope of this disclosure.

Figure 12:
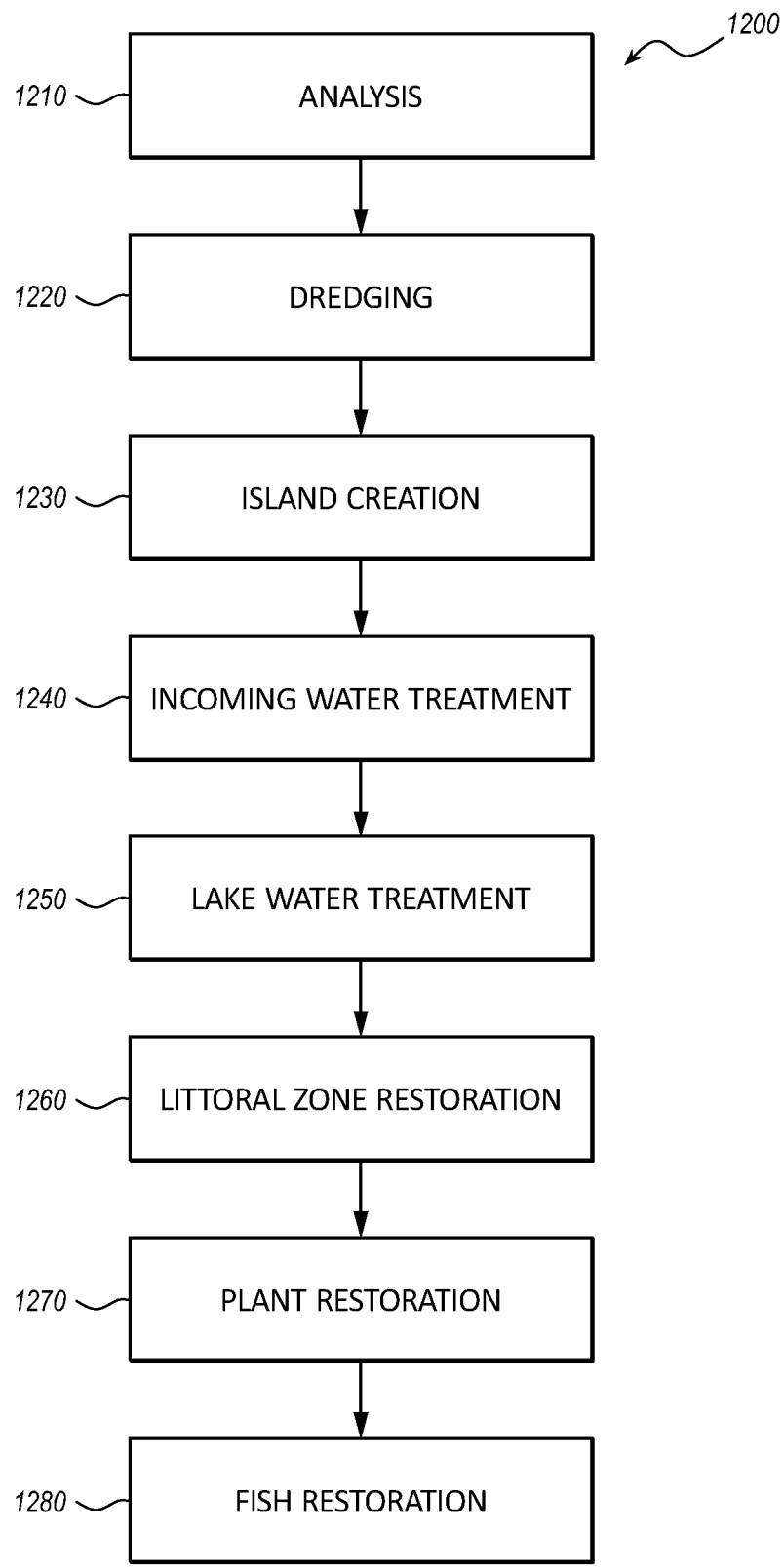
FIG. 12 is a flow chart of a lake restoration process.

FIG. 12 illustrates one embodiment of a lake restoration process 1200. The steps of any process embodiments described herein do not necessarily need to be executed in any specific order, or even sequentially, nor need the steps be executed only once, unless otherwise specified. Furthermore, in some embodiments, one or more of the steps described herein may be omitted. The lake restoration process 1200 may include analysis 1210 of the state or condition of a lake. The analysis 1210 may include taking measurements and/or performing tests associated with the condition of the lake. In some embodiments, the analysis 1210 may include measuring the quality of the lake water. Tests and measurements of the lake water may include, but not be limited to, levels of nitrogen, phosphorous, oxygen, salinity, total dissolved solids, suspended sediments, and temperature.

The analysis 1210 may include assessing environmental conditions surrounding the lake, including but not limited to, wind and the resulting wave action on the lake surface, incoming and outgoing river flows, temperature ranges, humidity, storm water run-off, waste water treatment facility effluent, shore line plants, soil, and core samples of the lake bed. Other conditions of the lake to be analyzed may include bathymetry, surface area, altitude, currents, stagnation, recreational use, littoral zone status, invasive and native fish, animals, and plants. The analysis 1210 may also include scientific modeling of the lake, which may predict how one or more processes may affect the condition of the lake. The analysis 1210 may be performed with a computer model.

The analysis 1210 may include specifically assessing the height, wave period, wave number, and wave length of the waves at various locations on the lake surface. The specific wave analysis 1210 may also include the resulting orbital velocity (force exerted on the bottom of the lake) at various locations along the bottom of the lake. The analysis 1210 may also include assessing the conditions of sediments disposed on the lake bottom, which conditions may include, but not be limited to, volume, depth, location, particulate size, and nutrient level. Specific water analysis 1210 may include nutrient and/or pollutant levels at various locations within the lake and identifying the sources of the nutrients and/or pollutants.

The lake restoration process 1200 may include dredging 1220 the bottom of the lake. Dredging 1220 may include removing sediments from the bottom of the lake which sediments may include fine particles with elevated levels of nutrients such as nitrogen and phosphorous, for example. Dredging 1220 may include increasing the average depth of the lake, shaping the underwater topography of the lake, providing channels and littoral zones. Dredging 1220 may also increase the water-holding capacity of the lake. Dredging 1220 may further include gathering and encapsulating the sediments into geotubes.

The lake restoration process 1200 may also include island creation 1230, which may include the design, construction, and placement of islands. The islands may be formed from sediment material dredged from the bottom of the lake including the sediment encapsulated in geotubes. The islands may be shaped and positioned to disrupt wind patterns, reduce fetch lengths, and impede wave action. Island creation 1230 may include compaction of the island materials according to the engineering specifications and/or standards so as to provide foundational capacity to support structures such as buildings.

The lake restoration process 1200 may also include the incoming water treatment 1240, i.e., the treatment of water entering the lake. Incoming water treatment 1240 may include biofiltering run-off water inflows and reducing the phosphorous and nitrogen levels of effluent water from waste water treatment facilities.

The lake restoration process 1200 may also include lake water treatment 1250, i.e., the treatment of water within the lake. Lake water treatment 1250 may include oxygenating, circulating, and biofiltering the lake water. Biofiltering the lake water may include pumping the lake water onto constructed streambeds in areas surrounding the lake or on the islands.

The lake restoration process 1200 may also include littoral zone restoration 1260, i.e., the restoration or creation of littoral zones which may include contouring the lake bed and planting littoral zone plants. Planting littoral zone plants may include disposing a portion of a littoral zone plant through an opening in a planting mat.

The lake restoration process 1200 may also include plant restoration 1270, which may comprise removing invasive plants and planting native plants along the shorelines and/or within the lake.

The lake restoration process 1200 may also include fish restoration 1280, which may comprise removing non-native fish and/or animals from the lake and/or surrounding areas, and re-introducing native fish and/or animals back into the lake and/or surrounding areas. Restoring native fish may include collecting native fish species from the lake, breading and raising the native fish species, and re-introducing the native fish species back into the lake.

EXAMPLE EMBODIMENTS

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1. A system to restore a body of water, comprising: one or more dredgers to remove sediment from a bed of the body of water to increase depth of the body of water; and one or more geotubes to receive and encapsulate sediment removed from the bed of the body of water, the one or more geotubes to be arranged to form a border for one or more islands within the body of water, the one or more islands positioned to at least one of (i) disrupt wind patterns across a surface of the body of water, (ii) reduce fetch length, and (iii) impede wave action, wherein the one or more dredgers pump sediment to fill the geotubes, and wherein the one or more dredgers pump sediment to provide island material to infill the border formed by the geotubes for each of the one or more islands to construct the one or more islands.

Example 2. The system of example 1, further comprising computer modeling to model: the wind patterns across a surface of the body of water; wave action of the body of water; and force exerted by waves on the bed of the body of water.

Example 3. The system of example 1, wherein the dredgers are further to change bathymetry of the body of water.

Example 4. The system of example 1, wherein each of the one or more geotubes comprises geotextile material configured to allow passage of water and to retain the sediment received therein.

Example 5. The system of example 1, wherein each of the one or more islands are constructed to emerge above a surface of the body of water.

Example 6. The system of example 1, wherein the one or more islands are further positioned to at least partially define channels that influence circulation and/or temperature within the body of water.

Example 7. The system of example 1, wherein the one or more dredgers are further to, when pumping sediment to fill the geotube, drive water out of the one or more geotubes to consolidate and compress the sediment.

Example 8. The system of example 1, further comprising one or more premanufactured vertical drains (PVDs) to be positioned within the island material of the one or more islands to facilitate dewatering of island material and aid compaction of the one or more islands.

Example 9. The system of example 1, further comprising compaction equipment to compact the island material of the one or more islands.

Example 10. The system of example 1, further comprising water quality equipment to treat one or more sources of incoming water flowing into the body of water, the water quality equipment to reduce nutrient content of the incoming water.

Example 11. The system of example 1, further comprising invasive plant species eradication equipment to eradicate one or more invasive plant species of the body of water.

Example 12. The system of example 1, further comprising invasive animal species eradication equipment to eradicate one or more invasive animal species of the body of water.

Example 13. The system of example 1, further comprising native plant species introduction equipment to plant one or more native plant species of the body of water.

Example 14. The system of example 13, wherein the plant species introduction equipment is to plant one or more native plant species of the body of water at submerged littoral zones within the body of water where light penetrates all the way to the bed of the body of water.

Example 15. The system of example 13, wherein the plant species introduction equipment comprises: one or more planting mats to secure one or more native plant species to the bed of the body of water at submerged littoral zones.

Example 16. The system of example 1, further comprising native animal species introduction equipment to introduce one or more native animal species of the body of water.

Example 17. The system of example 1, further comprising one or more aeration systems to provide air bubbles with the body of water thereby increasing the dissolved oxygen content of the body of water.

Example 18. The system of example 1, further comprising one or more biofiltration systems each including one or more pumps to pump water from within the body of water onto biofiltration media within constructed streambeds to filter the water and reduce nutrient content of the water.

Example 19. The system of example 1, further comprising one or more circulation pumps to induce current within the body of water.

Example 20. A method for restoring a body of water, comprising: analyzing the body of water to determine conditions of the body of water, the conditions comprising: wind patterns across the surface of the body of water and the resulting wave action of the body of water including wave height, force of the wave action on a bed of the body of water, and depth of a layer of sediment disposed on the bed of the body of water; dredging the bed of the body of water to increase a depth of the body of water and to remove the sediment from the bed of the body of water; and forming one or more islands within the body of water using dredged material including the sediment from the bed of the body of water.

Example 21. The method of example 20, further comprising positioning the one or more islands to (i) disrupt the wind patterns across the surface of the body of water, (ii) reduce fetch length and (iii) impede wave action.

Example 22. The method of example 20, wherein forming the one or more islands comprises positioning one or more premanufactured vertical drains (PVDs) within the dredged material to dewater the dredged material.

Example 23. The method of example 20, wherein forming the one or more islands comprises compacting the dredged material according to desired engineering specifications and/or standards and provide structural capacity to support structures on the one or more islands.

Example 24. The method of example 20, and wherein forming one or more islands further comprises positioning the one or more geotubes within the body of water to define at least a partial border around each of the one or more islands, and wherein dredging further comprises encapsulating the sediment in the one or more geotubes to create the partial border.

Example 25. The method of example 24, wherein analyzing further comprises determining the nutrient content of the sediment, and wherein the sediment encapsulated in the one or more geotubes comprises an elevated nutrient content.

Example 26. The method of example 20, wherein dredging further comprises creating channels along the bed of the body of water to influence circulation and/or temperature of the body of water.

Example 27. The method of example 20, wherein analyzing further comprises determining a nutrient content of incoming water flowing into the body of water, and wherein the method further comprises treating the incoming water to reduce the nutrient content of the incoming water thereby increasing the water quality of the incoming water.

Example 28. The method of example 20, further comprising eradicating one or more invasive plant species of the body of water and/or a shoreline of the body of water.

Example 29. The method of example 20, further comprising eradicating one or more invasive animal species of the body of water.

Example 30. The method of example 20, further comprising introducing one or more native plant species to the body of water, the introduction to one or more of an area within the body of water and along a shoreline of the body of water.

Example 31. The method of example 20, further comprising introducing one or more native animal species to the body of water.

Example 32. The method of example 31, wherein introducing one or more native animal species of the body of water further comprises collecting at least one of the one or more native animal species from the body of water.

Example 33. A system to restore an ecosystem of a body of water, comprising: computer implemented modeling of wind patterns across a surface of the body of water, wave action including wave height, wave period, wave number, wave length, of the body of water, force exerted by waves or orbital velocity on a bed or bottom of the body of water, depth of a layer of nutrient loaded sediment on a bed or bottom of the body of water, sources of pollutants/nutrients, native species of plants and/or animals, invasive species of plants and/or animals; one or more dredgers to remove or dredge fine nutrient loaded sediment from a bed of the body of water to increase average depth of the body of water and change bathymetry of the body of water; one or more geotubes to receive and encapsulate, consolidate, and compress sediment removed from the bed of the body of water, each geotube comprising geotextile material (e.g., geofabric) configured to allow passage of water and to retain the sediment received therein, the one or more geotubes to be arranged to form a border or perimeter for one or more islands, e.g., land masses within the body of water and emerging above a surface of the body of water, the one or more islands positioned to at least one of (i) disrupt wind patterns across a surface of the body of water, (ii) reduce fetch length, i.e., a length of water between opposing shorelines over which a wind blows that creates wave action on the surface of the body of water, and (iii) impede wave action, and at least partially define channels that influence circulation and/or temperature within the body of water, wherein the one or more dredgers pump fine nutrient loaded sediment to fill the geotubes and drive water out of the one or more geotubes to consolidate and compress the fine nutrient loaded sediment, and wherein the one or more dredgers pump fine nutrient loaded sediment dredge material to provide island material to infill the border formed by the geotubes for each of the one or more islands to construct the one or more islands; one or more premanufactured vertical drains (PVDs) to be positioned within the island material of the one or more islands to facilitate dewatering of island material and aid compaction of the one or more islands; compaction equipment to compact the island material of the one or more islands according to desired engineering specifications and/or standards and provide structural capacity to support structures on the one or more islands, the compaction equipment comprising at least one of conventional rolling, impact rolling, rapid dynamic compaction, and dynamic compaction equipment; water quality equipment to treat one or more sources of incoming water flowing into the body of water, the water quality equipment to reduce nutrient content of the incoming water and thereby decrease nutrient loading of the body of water; invasive plant species eradication equipment to eradicate or reduce one or more invasive plant species of the body of water along a shoreline of the body of water and/or within the body of water; invasive animal species including fish eradication equipment to eradicate or reduce one or more invasive animal species including fish of the body of water along a shoreline of the body of water and/or within the body of water; native plant species introduction equipment to plant or restore one or more native plant species of the body of water along a shoreline of the body of water to restore riparian zones and/or within the body of water to restore littoral zones; and native animal species including fish introduction equipment to introduce one or more native animal species including fish of the body of water along a shoreline of the body of water and/or within the body of water.

Example 34. A method for restoring an ecosystem of a body of water, comprising: analyzing a body of water to determine wind patterns across a surface of the body of water, wave action including wave height, wave period, wave number, wave length, of the body of water, force exerted by waves or orbital velocity on a bed or bottom of the body of water, depth of a layer of nutrient loaded sediment on a bed or bottom of the body of water, sources of pollutants/nutrients, native species of plants and/or animals, invasive species of plants and/or animals; removing or dredging fine nutrient loaded sediment from a bed of the body of water to increase average depth of the body of water and change bathymetry of the body of water; forming one or more islands (land masses) within the body of water and emerging above a surface of the body of water using sediment removed from the bed of the body of water, the one or more islands positioned to at least one of (i) disrupt wind patterns across a surface of the body of water, (ii) reduce fetch length i.e., a length of water over which a wind blows that creates wave action on the surface of the body of water, and (iii) impede wave action, and at least partially define channels that influence circulation and/or temperature within the body of water; compact the island material of the one or more islands according to desired engineering specifications and/or standards and provide structural capacity to support structures on the one or more islands; treating (including biofiltering) one or more sources of incoming water flowing into the body of water to reduce nutrient content of the incoming water, and thereby decrease nutrient loading of the body of water, and improve water quality of the incoming water; eradicating or reducing one or more invasive plant species of the body of water along a shoreline of the body of water and/or within the body of water; eradicating or reducing one or more invasive animal species including fish species of the body of water along a shoreline of the body of water and/or within the body of water; planting or restoring one or more native plant species of the body of water along a shoreline of the body of water and/or within the body of water; and planting or restoring one or more native animal species including fish species of the body of water along a shoreline of the body of water and/or within the body of water.

Example 35. A system to restore a littoral zone with in a body of water, the littoral zone comprising an area of the body of water where light penetrates to a bed of the body of water, the system comprising: computer implemented modeling of wind patterns across a surface of the body of water, wave action including wave height, wave period, wave number, wave length, of the body of water, force exerted by waves or orbital velocity on a bed or bottom of the body of water, depth of a layer of nutrient loaded sediment on a bed or bottom of the body of water, sources of pollutants/nutrients, native species of plants and/or animals, invasive species of plants and/or animals, length and width of the body of water; one or more dredgers to remove or dredge fine nutrient loaded sediment from the bed of the body of water and to increase depth of the body of water within the littoral zone up to 15 feet deep and change bathymetry of the body of water; one or more geotubes to receive and encapsulate sediment removed from the bed of the body of water, each geotube comprising geotextile material (e.g., geofabric) configured to allow passage of water and to retain the sediment received therein, the one or more geotubes to be arranged to form a border or perimeter for one or more islands within the body of water, the one or more islands positioned to at least one of (i) disrupt wind patterns across a surface of the body of water, (ii) reduce fetch length i.e., a length of water over which a wind blows that creates wave action on the surface of the body of water, and (iii) impede wave action, wherein the one or more dredgers pump sediment to fill the geotubes, and wherein the one or more dredgers pump sediment dredge material to provide island material to infill the border formed by the geotubes for each of the one or more islands to construct the one or more islands; water quality equipment to treat one or more sources of incoming water flowing into the body of water, the water quality equipment to reduce nutrient content of the incoming water and thereby decrease nutrient loading of the body of water; invasive plant species eradication equipment to eradicate or reduce one or more invasive plant species of the body of water at least within the littoral zone and along a shoreline of the body of water and/or within the body of water; invasive animal species including fish species eradication equipment to eradicate or reduce one or more invasive animal species including fish species of the body of water along a shoreline of the body of water and/or within the body of water; native plant species introduction equipment to plant or restore one or more native plant species of the body of water within the littoral zone and/or along a shoreline of the body of water to restore riparian zones, the native plant species introduction equipment including one or more mats to secure starts of littoral zone plants, the mats to be secured to the bed of the body of water to plant the starts of littoral zone plants in the littoral zone; and native animal species including fish species introduction equipment to introduce one or more native animal species including fish species of the body of water along a shoreline of the body of water and/or within the body of water.

Example 36. A method for restoring a littoral zone within a body of water, the littoral zone comprising an area of the body of water where light penetrates to a bed of the body of water, the method comprising: analyzing a body of water to determine wind patterns across a surface of the body of water, wave action including wave height, wave period, wave number, wave length, of the body of water, force exerted by waves or orbital velocity on a bed or bottom of the body of water, depth of a layer of nutrient loaded sediment on a bed or bottom of the body of water, sources of pollutants/nutrients, native species of plants and/or animals, invasive species of plants and/or animals; removing or dredging fine nutrient loaded sediment from a bed of the body of water to increase average depth of the body of water within the littoral zone up to 15 feet deep and change bathymetry of the body of water; filling geotubes with dredge material (e.g., sediment from the bed of the body of water) to form a border of one or more islands within the body of water; infilling the border to create the islands to emerge above a surface of the body of water using dredge material, which may include the sediment removed from the bed of the body of water, the one or more islands positioned to reduce orbital velocity force on the bottom of the body of water due to wave action by at least one of (i) disrupting wind patterns across a surface of the body of water above the littoral zone, (ii) reducing fetch length, i.e., a length of water over which a wind blows that creates wave action on the surface of the body of water, and (iii) impeding wave action within the littoral zone, and at least partially define channels that influence circulation and/or temperature within the body of water; treating (including biofiltering) one or more sources of incoming water flowing into the body of water to reduce nutrient content of the incoming water, and thereby decrease nutrient loading of the body of water, and improve water quality of the littoral zone; eradicating or reducing one or more invasive plant species of the body of water at least within the littoral zone along a shoreline of the body of water and/or within the body of water; eradicating or reducing one or more invasive animal species including fish of the body of water along a shoreline of the body of water and/or within the body of water; planting or restoring one or more native plant species of the body of water along a shoreline of the body of water and/or within the body of water; and planting or restoring one or more native animal species including fish species of the body of water along a shoreline of the body of water and/or within the body of water.

Example 37. The method of example 36, further comprising securing mats of starts of littoral zone plants to the bed of the body of water within the littoral zone, the mats securing the starts of littoral zone plants to plant the starts of littoral zone plants in the littoral zone, wherein the mats are biodegradable to disintegrate into the body of water as roots of the starts of littoral zone plants grow into or otherwise take hold of the bed of the body of water.

Example 38. A system for controlling wave action within a body of water comprising: computer implemented modeling of wind patterns across a surface of the body of water, wave action including wave height, wave period, wave number, wave length, of the body of water, length and width of the body of water, and depth of the body of water; one or more dredgers to remove or dredge fine nutrient loaded sediment from a bed of the body of water to increase average depth of the body of water and change bathymetry of the body of water which may include creating one or more channels; one or more geotubes to receive and encapsulate, consolidate, and compress sediment removed from the bed of the body of water, each geotube comprising geotextile material (e.g., geofabric) configured to allow passage of water and to retain the sediment received therein, the one or more geotubes to be arranged to form a border or perimeter for one or more islands, e.g., land masses within the body of water and emerging above a surface of the body of water, the one or more islands positioned to at least one of (i) disrupt wind patterns across a surface of the body of water, (ii) reduce fetch length, i.e., a length of water between opposing shorelines over which a wind blows that creates wave action on the surface of the body of water, and (iii) impede wave action, and at least partially define the one or more channels that influence circulation and/or temperature within the body of water, wherein the one or more dredgers pump fine nutrient loaded sediment to fill the geotubes and drive water out of the one or more geotubes to consolidate and compress the fine nutrient loaded sediment, and wherein the one or more dredgers pump fine nutrient loaded sediment dredge material to provide island material to infill the border formed by the geotubes for each of the one or more islands to construct the one or more islands.

Example 39. A method for controlling altering wave action within a body of water, comprising: analyzing a body of water to determine wind patterns across a surface of the body of water, wave action including wave height, wave period, wave number, and wave length of the body of water, and force exerted by waves or orbital velocity on a bed or bottom of the body of water; removing dredging sediment from the bed of the body of water to increase average depth of the body of water and change bathymetry of the body of water; positioning geotubes to form a border of one or more islands within the body of water, the geotubes positioned to create the one or more islands to at least one of (i) disrupt wind patterns across a surface of the body of water, (ii) reduce fetch length i.e., a length of water over which a wind blows that creates wave action on the surface of the body of water, (iii) impede wave action, and at least partially define channels that influence circulation and/or temperature within the body of water, and (iv) create harbors within the body of water; filling the geotubes with dredge material (e.g., sediment from the bed of the body of water); and infilling the border to create the islands to emerge above a surface of the body of water using dredge material which may include the sediment removed from the bed of the body of water.

Example 40. A system to restore and develop a body of water, comprising: computer implemented modeling of wind patterns across a surface of the body of water, wave action including wave height, wave period, wave number, wave length, of the body of water, force exerted by waves or orbital velocity on a bed or bottom of the body of water, length and width of the body of water, depth of a layer of nutrient loaded sediment on a bed or bottom of the body of water, sources of pollutants/nutrients, native species of plants and/or animals, invasive species of plants and/or animals; one or more dredgers to remove or dredge fine nutrient loaded sediment from a bed of the body of water to increase average depth of the body of water and change bathymetry of the body of water; one or more geotubes to receive and encapsulate and consolidate and compress sediment removed from the bed of the body of water, each geotube comprising geotextile material (e.g., geofabric) configured to allow passage of water and to retain the sediment received therein, the one or more geotubes to be arranged to form a border or perimeter for one or more islands e.g., land masses within the body of water and emerging above a surface of the body of water, the one or more islands positioned to at least one of (i) disrupt wind patterns across a surface of the body of water, (ii) reduce fetch length i.e., a length of water over which a wind blows that creates wave action on the surface of the body of water, and (iii) impede wave action, and at least partially define channels that influence circulation and/or temperature within the body of water, wherein the one or more dredgers pump fine nutrient loaded sediment to fill the geotubes and drive water out of the one or more geotubes to consolidate and compress the fine nutrient loaded sediment, and wherein the one or more dredgers pump fine nutrient loaded sediment dredge material to provide island material to infill the border formed by the geotubes for each of the one or more islands to construct the one or more islands; one or more premanufactured vertical drains (PVDs) to be positioned within the island material of the one or more islands to facilitate dewatering of island material and aid compaction of the island material of the one or more islands; compaction equipment to compact the island material of the one or more islands according to desired engineering specifications and/or standards and provide structural capacity to support structures on the one or more islands; water quality equipment to treat one or more sources of incoming water flowing into the body of water, the water quality equipment to reduce nutrient content of the incoming water and thereby decrease nutrient loading of the body of water to restore a natural composition of the incoming water; invasive plant species eradication equipment to eradicate or reduce one or more invasive plant species of the body of water along a shoreline of the body of water and/or within the body of water; invasive animal species including fish species eradication equipment to eradicate or reduce one or more invasive animal species including fish species of the body of water along a shoreline of the body of water and/or within the body of water; native plant species introduction equipment to plant or restore one or more native plant species of the body of water along a shoreline of the body of water to restore riparian zones and/or within the body of water to restore littoral zones; native animal species including fish species introduction equipment to introduce one or more native animal species including fish species of the body of water along a shoreline of the body of water and/or within the body of water; and structure erection equipment to erect one or more structures on the one or more islands for human habitation.

Example 41. A method for restoring and developing a body of water, comprising: analyzing a body of water to determine wind patterns across a surface of the body of water, wave action including wave height, wave period, wave number, and wave length of the body of water, force exerted by waves or orbital velocity on a bed or bottom of the body of water, depth of a layer of nutrient loaded sediment on a bed or bottom of the body of water, sources of pollutants/nutrients, native species of plants and/or animals, invasive species of plants and/or animals; collecting resources e.g., fundraising, financing, for restoration and development of a first portion e.g., a natural bay, of the body of water to accommodate development; restoring the first portion of the body of water utilizing the collected resources, by: removing dredging fine nutrient loaded sediment from a bed of the first portion of the body of water to increase average depth of the body of water and change bathymetry of the first portion of the body of water to restore a natural state of flow and/or circulation of the water within the first portion of the body of water; positioning geotubes to form a border of a barrier (e.g., a causeway) to construct a barrier to isolate the first portion of the body of water from a remainder of the body of water; filling geotubes with dredge material (e.g., sediment from the bed of the body of water) to erect the border of the barrier; infilling the border to erect a land mass barrier rising above the surface of the body of water using dredge material (e.g., the sediment removed from the bed of the first portion of the body of water), compacting the land mass barrier according to desired/relevant engineering specifications and/or standards and provide capacity to support infrastructure structures on the land mass barrier; treating (including biofiltering) one or more sources of incoming water flowing into the first portion of the body of water to reduce nutrient content of the incoming water, and thereby decrease nutrient loading of the body of water, and improve water quality of the incoming water; eradicating or reducing one or more invasive plant species of the body of water along a shoreline of the first portion of the body of water and/or within the first portion of body of water; eradicating or reducing one or more invasive animal species including fish species within the first portion of the body of water along a shoreline of and/or within the first portion of body of water; planting or restoring one or more native plant species within the first portion of the body of water along a shoreline of and/or within the first portion of the body of water; planting or restoring one or more native animal species including fish species within the first portion of the body of water along a shoreline and/or within the first portion of the body of water; and erecting one or more structures on the barrier (e.g. roads, bridges, dikes); exchanging (e.g., selling) shoreline real estate at or on or surrounding the first portion of the body of water for proceeds; restoring a second portion of the body of water utilizing the proceeds from the restoration and development of the first portion, by: removing dredging fine nutrient loaded sediment from a bed of the second portion of the body of water to increase average depth of the second portion body of water and change bathymetry of the second portion of the body of water to restore a natural state of flow and/or circulation of the water; positioning geotubes to form a border of one or more islands within the second portion of the body of water, the geotubes positioned to create the one or more islands to at least one of (i) disrupt wind patterns across a surface of the body of water, (ii) reduce fetch length i.e., a length of water over which a wind blows that creates wave action on the surface of the body of water, (iii) impede wave action, and at least partially define channels that influence circulation and/or temperature within the body of water, and (iv) create harbors within the body of water; filling the geotubes with dredge material (e.g., sediment from the bed of the body of water); and infilling the border to create the islands to emerge above a surface of the body of water using dredge material (e.g., the sediment removed from the bed of the body of water); compacting the island material of the one or more islands according to desired engineering specifications and/or standards and provide structural capacity to support structures on the one or more islands; treating (including biofiltering) one or more sources of incoming water flowing into the second portion of the body of water to reduce nutrient content of the incoming water, and thereby decrease nutrient loading of the body of water, and improve water quality of the incoming water; eradicating or reducing one or more invasive plant species of the body of water along a shoreline of and/or within the second portion of the body of water; eradicating or reducing one or more invasive animal species including fish species of the body of water along a shoreline and/or within the second portion of the body of water; planting or restoring one or more native plant species of the body of water along a shoreline of and/or within the second portion of the body of water; planting or restoring one or more native animal species including fish species of the body of water along a shoreline of and/or within the second portion of the body of water; and erecting one or more structures on the one or more islands for human habitation; exchanging (e.g., selling) shoreline real estate at or on or surrounding the second portion of the body of water to recoup e.g., repay resources utilized to restore the second portion of the body of water.

Example 42. A system for restoring a eutrophic lake where elevated nutrient levels within the water column such as nitrogen and phosphorous provide an elevated nutrient level to algae and/or other microorganisms resulting in algal blooms during warm water periods, the system comprising: a nutrient removal apparatus, wherein the nutrient removal apparatus removes nutrient loaded sediments on the lake bed to a predetermined depth to remove nutrients that have leached into an upper level of the lake bed; an encapsulation apparatus being configured to hold the nutrient loaded sediments removed from the lake bed by the nutrient removal apparatus, wherein the encapsulation apparatus effectively sequesters both the nutrient loaded sediments and the nutrients within the sediments to prevent the nutrients within the sediments from leaching back into the water column or the upper level of the lake bed; a littoral zone plant restoration apparatus configured to restore submerged and emergent plants in the lake bed after removal of the nutrient loaded sediments from the lake bed, wherein the submerged and emergent plants facilitate nutrient utilization in the water column and/or the lake bed; a system for reducing orbital velocity forces on the lake bed to facilitate rooting of the submerged and/or emergent plants by (i) placing islands in the lake extending above the surface of the lake to reduce wave height and/or (ii) increasing depth of the lake by dredging.

Example 43. The system of example 42, wherein the nutrient removal apparatus comprises equipment to compress the nutrient loaded sediments within the encapsulation apparatus.

Example 44. The system of example 42, wherein the encapsulation apparatus comprises one or more geotubes formed of a porous material configured to allow passage of water and to retain the sediment received therein.

Example 45. The system of example 44, wherein the one or more geotubes are arranged to form a border for one or more of the islands.

Example 46. The system of example 45, wherein the nutrient removal apparatus comprises equipment to infill the border formed by the one or more geotubes with material dredged from the lake bed.

Example 47. The system of example 42, wherein the system for reducing orbital velocity forces further comprises computer modeling to model: wind patterns across a surface of the body of water; fetch lengths along the surface of the body of water; wave action of the body of water; depth of the body of water; and orbital velocity forces exerted by waves on the bed of the body of water.

Example 48. The system of example 42, wherein the littoral zone plant restoration apparatus comprises invasive plant species eradication equipment to eradicate one or more invasive plant species of the body of water.

Example 49. The system of example 43, wherein the littoral zone plant restoration apparatus further comprises native plant species introduction equipment to plant one or more native plant species of the body of water.

Example 50. The system of example 49, wherein the plant species introduction equipment is to plant one or more native plant species of the body of water at submerged littoral zones within the body of water where light penetrates all the way to the bed of the body of water.

Example 51. The system of example 42, wherein the littoral zone plant restoration apparatus further comprises one or more planting mats to secure one or more native plant species to the bed of the body of water at submerged littoral zones.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure. The scope of the present invention should, therefore, be determined only by the following claims.

The invention claimed is:

1. A system to restore a body of water, comprising:
one or more dredgers to remove sediment from a bed of the body of water to increase depth of the body of water; and
one or more geotubes to receive and encapsulate nutrient loaded sediments removed from the bed of the body of water, wherein the one or more geotubes effectively sequester both the nutrient loaded sediments and the nutrients within the sediments to prevent the nutrients within the sediments from leaching out of the one or more geotubes, wherein the one or more geotubes are to be arranged to form a border for one or more islands within the body of water, the one or more islands positioned to at least one of (i) disrupt wind patterns across a surface of the body of water, (ii) reduce fetch length, and (iii) impede wave action, wherein the one or more dredgers pump sediment to fill the geotubes, and
wherein the one or more dredgers pump sediment to provide island material to infill a region defined by the border formed by the geotubes for each of the one or more islands to construct the one or more islands.

2. The system of claim 1, further comprising computer modeling to model:
the wind patterns across a surface of the body of water;
wave action of the body of water; and
force exerted by waves on the bed of the body of water.

3. The system of claim 1, wherein each of the one or more geotubes comprises geotextile material configured to allow passage of water and to retain the sediment received therein.

4. The system of claim 1, wherein the one or more dredgers are further to, when pumping sediment to fill the geotube, drive water out of the one or more geotubes to consolidate and compress the sediment.

5. The system of claim 1, further comprising one or more premanufactured vertical drains (PVDs) to be positioned within the island material of the one or more islands to facilitate dewatering of island material and aid compaction of the one or more islands.

6. The system of claim 1, further comprising compaction equipment to compact the island material of the one or more islands.

7. The system of claim 1, further comprising water quality equipment to treat one or more sources of incoming water flowing into the body of water, the water quality equipment to reduce nutrient content of the incoming water.

8. The system of claim 1, further comprising invasive plant species eradication equipment to eradicate one or more invasive plant species of the body of water.

9. The system of claim 1, further comprising invasive animal species eradication equipment to eradicate one or more invasive animal species of the body of water.

10. The system of claim 1, further comprising native plant species introduction equipment to plant one or more native plant species of the body of water.

11. The system of claim 10, wherein the plant species introduction equipment is to plant one or more native plant species of the body of water at submerged littoral zones within the body of water where light penetrates all the way to the bed of the body of water.

12. The system of claim 10, wherein the plant species introduction equipment comprises:
one or more planting mats to secure one or more native plant species to the bed of the body of water at submerged littoral zones.

13. The system of claim 1, further comprising native animal species introduction equipment to introduce one or more native animal species of the body of water.

14. The system of claim 1, further comprising one or more biofiltration systems each including one or more pumps to pump water from within the body of water onto biofiltration media within constructed streambeds to filter the water and reduce nutrient content of the water.

15. The system of claim 1, wherein the dredgers are further to change bathymetry of the body of water.

16. A system to restore an ecosystem of a body of water, comprising:
one or more dredgers to dredge nutrient loaded sediment from a bed of the body of water to increase average depth of the body of water and change bathymetry of the body of water;
one or more geotubes to receive sediment removed from the bed of the body of water, each geotube comprising geotextile material configured to allow passage of water and to retain the nutrient loaded sediment received therein, the one or more geotubes to be arranged to form a border or perimeter for one or more islands positioned to at least one of:
reduce a length of water between opposing shorelines over which a wind blows that creates wave action on the surface of the body of water, and
at least partially define channels that influence one of circulation and temperature within the body of water,
wherein the one or more dredgers pump the nutrient loaded sediment to fill the geotubes and drive water out of the one or more geotubes to consolidate and compress the nutrient loaded sediment, and
wherein the one or more dredgers pump fine nutrient loaded sediment dredge material to provide island material to infill the border formed by the geotubes for each of the one or more islands to construct the one or more islands;
compaction equipment to compact the island material of the one or more islands to provide structural capacity to support structures on the one or more islands; and
water quality equipment to treat one or more sources of incoming water flowing into the body of water, the water quality equipment to reduce nutrient content of the incoming water and thereby decrease nutrient loading of the body of water.

17. The system of claim 16, wherein the geotextile material is geofabric.

18. The system of claim 16, wherein the compaction equipment comprises at least one of conventional rolling, impact rolling, rapid dynamic compaction, and dynamic compaction equipment.

19. The system of claim 16, further comprising structure erection equipment to erect one or more structures on the one or more islands for human habitation.

20. The system of claim 16, further comprising one or more premanufactured vertical drains to be positioned within the island material of the one or more islands to facilitate dewatering of island material and aid compaction of the one or more islands.

* * * * *